(12) United States Patent
Zhang

(10) Patent No.: US 11,934,790 B2
(45) Date of Patent: Mar. 19, 2024

(54) NEURAL NETWORK TRAINING METHOD AND APPARATUS, SEMANTIC CLASSIFICATION METHOD AND APPARATUS AND MEDIUM

(71) Applicant: BOE Technology Group Co., Ltd., Beijing (CN)

(72) Inventor: Zhenzhong Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 388 days.

(21) Appl. No.: 17/418,836

(22) PCT Filed: Sep. 7, 2020

(86) PCT No.: PCT/CN2020/113740
§ 371 (c)(1),
(2) Date: Jun. 27, 2021

(87) PCT Pub. No.: WO2021/047473
PCT Pub. Date: Mar. 18, 2021

(65) Prior Publication Data
US 2022/0075955 A1    Mar. 10, 2022

(30) Foreign Application Priority Data

Sep. 9, 2019 (CN) .......................... 201910863457.8

(51) Int. Cl.
*G06F 40/30* (2020.01)
*G06N 3/082* (2023.01)
(52) U.S. Cl.
CPC ............. *G06F 40/30* (2020.01); *G06N 3/082* (2013.01)
(58) Field of Classification Search
CPC .................................. G06F 40/30; G06N 3/082
See application file for complete search history.

(56) References Cited

U.S. PATENT DOCUMENTS 11,748,613 B2 *  9/2023  Li ........................... G06F 40/30
                                            704/9
2018/0308487 A1 * 10/2018  Goel ................... G10L 15/1815
(Continued)

FOREIGN PATENT DOCUMENTS

CN          107766585 A         3/2018
CN          108229582 A         6/2018
(Continued)

OTHER PUBLICATIONS

Evaluation Object Extraction Model of Recurrent Neural Network Based on Attention Mechanism.

*Primary Examiner* — Mohammad K Islam
(74) *Attorney, Agent, or Firm* — IPro, PLLC

(57) ABSTRACT

Provided are a semantic classification method and apparatus, a neural network training method and apparatus and a storage medium. The semantic classification method includes: inputting a first remark relating to a first object; extracting a first common representation vector for representing a common representation in the first remark by processing the first remark using a common representation extractor; extracting a first single representation vector for representing a single representation in the first remark by processing the first remark using a first representation extractor; obtaining a first representation vector by splicing the first common representation vector and the first single representation vector; and obtaining a semantic classification of the first remark by processing the first representation vector using a first semantic classifier; where the common representation includes an intention representation which is used to remark on both the first object and a second object, the second object is an associated remarked object different from the first object, and the single representation in the first (Continued)

remark includes an intention representation which is only used to remark on the first object.

20 Claims, 9 Drawing Sheets

(56) References Cited

U.S. PATENT DOCUMENTS

| | | |
|---|---|---|
| 2019/0259474 A1 | 8/2019 | Wang et al. |
| 2019/0354883 A1 | 11/2019 | Aravamudan et al. |

FOREIGN PATENT DOCUMENTS

| | | | | |
|---|---|---|---|---|
| CN | 108363753 A | * | 8/2018 | ............. G06F 16/35 |
| CN | 108363753 A | | 8/2018 | |
| CN | 108664589 A | | 10/2018 | |
| CN | 108763204 A | | 11/2018 | |
| CN | 109377448 A | | 2/2019 | |
| CN | 109447906 A | | 3/2019 | |
| CN | 109544524 A | | 3/2019 | |
| CN | 109740154 A | | 5/2019 | |
| CN | 109783812 A | | 5/2019 | |
| CN | 110188776 A | | 8/2019 | |
| CN | 110222182 A | * | 9/2019 | ............. A63F 13/70 |
| CN | 110598786 A | | 12/2019 | |

* cited by examiner

NEURAL NETWORK TRAINING METHOD AND APPARATUS, SEMANTIC CLASSIFICATION METHOD AND APPARATUS AND MEDIUM

This application claims priority to Chinese Patent Application No. 201910863457.8 filed on Sep. 9, 2019, the entire content of which is incorporated herein by reference.

TECHNICAL FIELD

The present disclosure relates to methods of training a neural network, apparatuses of training a neural network, semantic classification methods, semantic classification apparatuses and storage media.

BACKGROUND

Artificial intelligence is a theory, method, technology and application system to simulate, extend and expand human intelligence, perceive environments, acquire and use knowledge to obtain a best result by a digital computer, or a machine under the control of the digital computer. In other words, artificial intelligence is a comprehensive technology of computer science, which attempts to know the essence of intelligence and produces a new intelligent machine that can respond in a manner similar to human intelligence. The artificial intelligence includes studying designing principles and implementation methods of various intelligent machines, so that the machines have perceiving, reasoning and decision-making functions. The artificial intelligence technology can be applied to the natural language processing (NLP) field. NLP is a crossing field of computer science, artificial intelligence and information engineering, which involves the knowledge of statistics and linguistics and the like, and aims to allow the computers to process or "understand" natural languages so as to execute the tasks such as text classification, language translation and question answer.

SUMMARY

At least one embodiment of the present disclosure provides a semantic classification method, including: inputting a first remark relating to a first object; extracting a first common representation vector for representing a common representation in the first remark by processing the first remark using a common representation extractor; extracting a first single representation vector for representing a single representation in the first remark by processing the first remark using a first representation extractor; obtaining a first representation vector by splicing the first common representation vector and the first single representation vector; and obtaining a semantic classification of the first remark by processing the first representation vector using a first semantic classifier; where the common representation includes an intention representation which is used to remark on both the first object and a second object, the second object is an associated remarked object different from the first object, and the single representation in the first remark includes an intention representation which is only used to remark on the first object.

For example, the semantic classification method according to some embodiments of the present disclosure further includes mapping the first remark as a first original vector; where processing the first remark using the common representation extractor includes: processing the first original vector using the common representation extractor; processing the first remark using the first representation extractor includes processing the first original vector using the first representation extractor.

For example, in the semantic classification method of some embodiments of the present disclosure, mapping the first remark as the first original vector includes: obtaining the first original vector by mapping each word in the first remark as a vector with a specified length based on word vector algorithm.

For example, in the semantic classification method of some embodiments of the present disclosure, the common representation extractor and the first representation extractor include one of a recurrent neural network, a long short term memory network and a bi-directional long short term memory network respectively, and the first semantic classifier includes a softmax classifier.

For example, the semantic classification method of some embodiments of the present disclosure further includes: inputting a second remark relating to the second object; extracting a second common representation vector for representing the common representation in the second remark by processing the second remark using the common representation extractor; extracting a second single representation vector for representing a single representation in the second remark by processing the second remark using a second representation extractor; obtaining a second representation vector by splicing the second common representation vector and the second single representation vector; and obtaining a semantic classification of the second remark by processing the second representation vector using a second semantic classifier; where the single representation in the second remark includes an intention representation which is only used to remark on the second object.

For example, the semantic classification method of some embodiments of the present disclosure further includes: mapping the second remark as a second original vector; where processing the second remark using the common representation extractor includes: processing the second original vector using the common representation extractor; processing the second remark using the second representation extractor includes processing the second original vector using the second representation extractor.

For example, in the semantic classification method of some embodiments of the present disclosure, mapping the second remark as the second original vector includes: obtaining the second original vector by mapping each word in the second remark as a vector with a specified length based on word vector algorithm.

For example, in the semantic classification method of some embodiments of the present disclosure, the second representation extractor includes one of a recurrent neural network, a long short term memory network and a bi-directional long short term memory network, and the second semantic classifier includes a softmax classifier.

For example, in the semantic classification method of some embodiments of the present disclosure, corpus sources of the first remark and the second remark include at least one of text or voice.

At least one embodiment of the present disclosure further provides a method of training a neural network. The neural network includes: a generative network, a first branch network, a first classification network, a second branch network and a second classification network. The training method includes a semantic classification training stage. The semantic classification training stage includes: inputting a first training remark relating to a first object, extracting a first training common representation vector by processing the first training remark using the generative network, extracting a first training single representation vector by processing the first training remark using the first branch network, obtaining a first training representation vector by splicing the first training common representation vector and the first training single representation vector, and obtaining a predicted class label of semantic classification of the first training remark by processing the first training representation vector using the first classification network; inputting a second training remark relating to a second object, extracting a second training common representation vector by processing the second training remark using the generative network, extracting a second training single representation vector by processing the second training remark using the second branch network, obtaining a second training representation vector by splicing the second training common representation vector and the second training single representation vector, and obtaining a predicted class label of semantic classification of the second training remark by processing the second training representation vector using the second classification network; calculating a system loss value through a system loss function based on the predicted class label of the first training remark and the predicted class label of the second training remark; and correcting parameters of the generative network, the first branch network, the first classification network, the second branch network and the second classification network based on the system loss value; where the first object and the second object are associated remarked objects.

For example, in the training method of some embodiments of the present disclosure, the semantic classification training stage further includes: mapping the first training remark as a first training original vector, and mapping the second training remark as a second training original vector; where processing the first training remark using the generative network includes: processing the first training original vector using the generative network; processing the first training remark using the first branch network includes: processing the first training original vector using the first branch network; processing the second training remark using the generative network includes: processing the second training original vector using the generative network; processing the second training remark using the second branch network includes: processing the second training original vector using the second branch network.

For example, in the training method of some embodiments of the present disclosure, mapping the first training remark as the first training original vector includes: obtaining the first training original vector by mapping each word in the first training remark as a vector with a specified length based on word vector algorithm; mapping the second training remark as the second training original vector includes: obtaining the second training original vector by mapping each word in the second training remark as a vector with a specified length based on word vector algorithm.

For example, in the training method of some embodiments of the present disclosure, the generative network, the first branch network and the second branch network each include one of a recurrent neural network, a long short term memory network and a bi-directional long short term memory network respectively, and the first classification network and the second classification network include a softmax classifier respectively.

For example, in the training method of some embodiments of the present disclosure, the system loss function is expressed as:

$L_{obj} = \lambda_1 \cdot L(Y1,T1) + \lambda_2 \cdot L(Y2,T2)$ where $L_{obj}$ represents the system loss function, $L(\bullet, \bullet)$ represents a cross entropy loss function, Y1 represents the predicted class label of the first training remark, T1 represents a true class label of the first training remark, $L(Y1,T1)$ represents a cross entropy loss function of the first training remark, $\lambda_1$ represents a weight of the cross entropy loss function $L(Y1,T1)$ of the first training remark in the system loss function, Y2 represents the predicted class label of the second training remark, T1 represents a true class label of the second training remark, $L(Y2,T2)$ represents a cross entropy loss function of the second training remark, $\lambda_2$ represents a weight of the cross entropy loss function $L(Y2,T2)$ of the second training remark in the system loss function.

The cross entropy loss function $L(\bullet, \bullet)$ is expressed as:

$$L(Y, T) = -\sum_{i=1}^{N}\sum_{j=1}^{K} Y_i^j \log(T_i^j)$$

where Y and T are formal parameters, N represents a number of training remarks, K represents a number of class labels of semantic classification, $Y_i^j$ represents a probability value of a j-th class label in predicted class labels of an i-th training remark, and $T_i^j$ represents a probability value of a j-th class label in true class labels of an i-th training remark.

For example, in the training method of some embodiments of the present disclosure, the neural network further includes a discriminative network; the training method further includes: a generative adversarial training stage; and performing the generative adversarial training stage and the semantic classification training stage alternately; where the generative adversarial training stage includes: training the discriminative network based on the generative network; training the generative network based on the discriminative network; and performing the above training processes alternately, so as to complete a training of the generative adversarial training stage.

For example, in the training method of some embodiments of the present disclosure, training the discriminative network based on the generative network includes: inputting a third training remark relating to the first object, extracting a third training common representation vector by processing the third training remark using the generative network, obtaining a third training output by processing the third training common representation vector using the discriminative network; inputting a fourth training remark relating to the second object, extracting a fourth training common representation vector by processing the fourth training remark using the generative network, obtaining a fourth training output by processing the fourth training common representation vector using the discriminative network; calculating a discriminative network adversarial loss value through a discriminative network adversarial loss function based on the third training output and the fourth training output; and correcting a parameter of the discriminative network based on the discriminative network adversarial loss value.

For example, in the training method of some embodiments of the present disclosure, the discriminative network includes a binary classification softmax classifier.

For example, in the training method of some embodiments of the present disclosure, the discriminative network adversarial loss function is expressed as:

$$L_D = -E_{z1 \sim P_{data}(z1)}[\log D(G(z1))] - E_{z2 \sim P_{data}(z2)}[1 - \log D(G(z2))]$$

where $L_D$ represents the discriminative network adversarial loss function, z1 represents the third training remark, $P_{data}(z1)$ represents a set of third training remarks, G(z1) represents the third training common representation vector, D(G(z1)) represents the third training output, $E_{z1 \sim P_{data}(z1)}$ represents an expectation value for the set of the third training remarks, z2 represents the fourth training remark, $P_{data}(z2)$ represents a set of fourth training remarks, G(z2) represents the fourth training common representation vector, D(G(z2)) represents the fourth training output, $E_{z2 \sim P_{data}(z2)}$ represents an expectation value for the set of the fourth training remarks.

For example, in the training method of some embodiments of the present disclosure, training the generative network based on the discriminative network includes: inputting a fifth training remark relating to the first object, extracting a fifth training common representation vector by processing the fifth training remark using the generative network, obtaining a fifth training output by processing the fifth training common representation vector using the discriminative network; inputting a sixth training remark relating to the second object, extracting a sixth training common representation vector by processing the sixth training remark using the generative network, obtaining a sixth training output by processing the sixth training common representation vector using the discriminative network; calculating a generative network adversarial loss value through a generative network adversarial loss function based on the fifth training output and the sixth training output; and correcting a parameter of the generative network based on the generative network adversarial loss value.

For example, in the training method of some embodiments of the present disclosure, the generative network adversarial loss function may be expressed as:

$$L_G = -E_{z3 \sim P_{data}(z3)}[\log D(G(z3))] - E_{z4 \sim P_{data}(z4)}[1 - \log D(G(z4))]$$

where $L_G$ represents the generative network adversarial loss function, z3 represents the fifth training remark, $P_{data}(z3)$ represents a set of fifth training remarks, G(z3) represents the fifth training common representation vector, D(G(z3)) represents the fifth training output, $E_{z3 \sim P_{data}(z3)}$ represents an expectation value for the set of the fifth training remarks, z4 represents the sixth training remark, $P_{data}(z4)$ rep resents a set of sixth training remarks, G(z4) represents the sixth training common representation vector, D(G(z4)) represents the sixth training output, $E_{z4 \sim P_{data}(z4)}$ represents an expectation value for the set of the sixth training remarks.

At least one embodiment of the present disclosure further provides a semantic classification apparatus, including: a memory, storing non-transitory computer readable instructions, and a processor for running the computer readable instructions. The computer readable instructions are executed by the processor to implement the semantic classification method according to any embodiment of the present disclosure.

At least one embodiment of the present disclosure further provides an apparatus of training a neural network, including: a memory, storing non-transitory computer readable instructions, and a processor for running the computer readable instructions. The computer readable instructions are executed by the processor to implement the training method according to any embodiment of the present disclosure.

At least one embodiment of the present disclosure further provides a storage medium storing non-transitory computer readable instructions. The non-transitory computer readable instructions are executed by a computer to execute instructions of the semantic classification method according to any embodiment of the present disclosure.

At least one embodiment of the present disclosure further provides a storage medium storing non-transitory computer readable instructions. The non-transitory computer readable instructions are executed by a computer to execute instructions of the training method according to any embodiment of the present disclosure.

BRIEF DESCRIPTION OF THE DRAWINGS

To make the technical solutions of the embodiments of the present disclosure clearer, the accompanying drawings of the embodiments will be briefly introduced below. Apparently, the accompanying drawings described below merely involve some embodiments of the present disclosure and shall not limit the present disclosure.

DETAILED DESCRIPTION OF THE EMBODIMENTS

Figure 1:
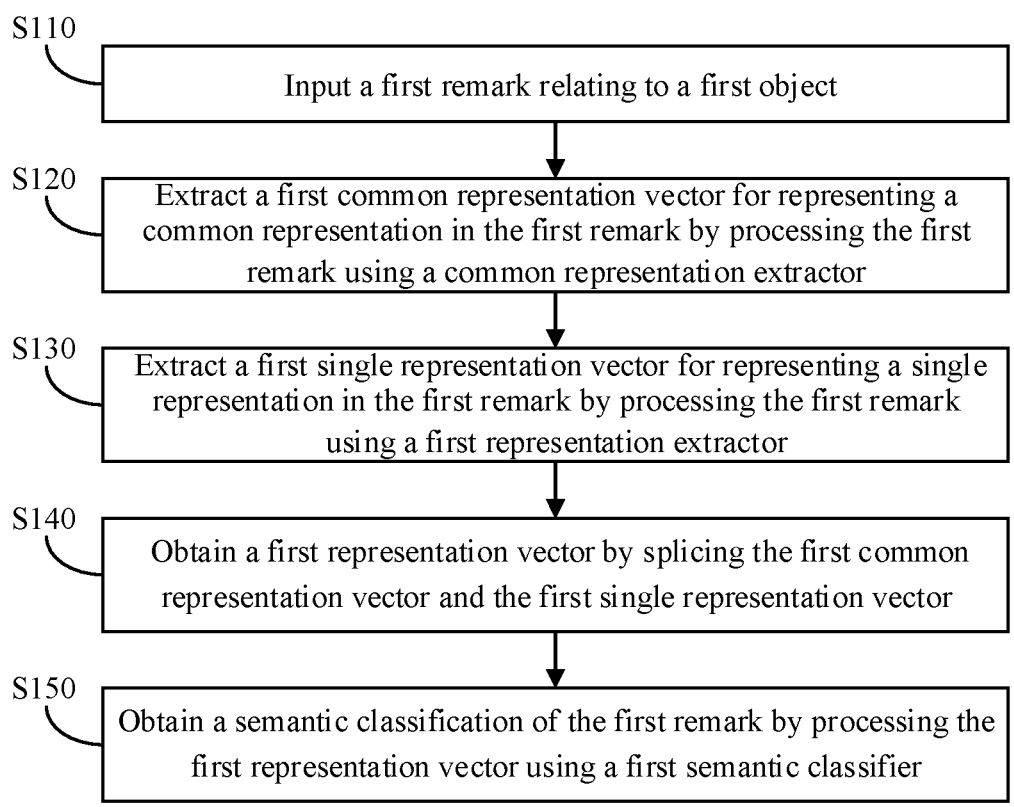
FIG. 1 is a flowchart of a semantic classification method according to at least one embodiment of the present disclosure.

To make the object, technical solutions and advantages of embodiments of the present disclosure clearer, the technical solutions of embodiments of the present disclosure will be described clearly and fully below in combination with drawings in the embodiments of the present disclosure. It is apparent that the described embodiments are merely part of embodiments of the present disclosure rather than all embodiments. Other embodiments achieved by those of ordinary skill in the art based on the embodiments in the present disclosure without paying creative work shall all fall into the scope of protection of the present disclosure.

Unless otherwise defined, the technical terms or scientific terms used in the present disclosure should have the general meanings that can be understood by those skilled in the prior art. The terms such as "first", "second" and the like used in the present disclosure are used not to represent any sequence, number or importance, but distinguish different components. "Including" or "comprising" and the like are intended to mean the elements or articles appearing before the word cover elements or articles or equivalents appearing after the word and do not preclude other elements or articles. "Connecting" or "coupling" and the like are not limited to physical connection or mechanical connection but can include direct or indirect electrical connection. The terms "upper", "lower", "left" and "right" and the like are used only to represent relative positional relationship, so that when an absolute position of a described object changes, the relative positional relationship may change accordingly.

The present disclosure will be described below in combination with several specific embodiments. To make the subsequent descriptions of the embodiments of the present disclosure clear and concise, detailed descriptions of known functions or known components are omitted in the present disclosure. When any one component of the embodiments of the present disclosure appear in more than one drawing, the component will be indicated by same or similar numeral in each drawing.

For example, along with the development of internet, people pay more and more attention to health and medical forums emerge widely. In a medical forum, the people participate in the topics in which they are interested, and discuss and exchange with other forum members. Therefore, there are a large number of subjective texts generated by users in the medical forum, for example, a user makes remarks about hospitals, doctors or drug treatments and the like in the medical forum according to his/her own medical experiences. Analysis of the user remarks in the medical forums has wide application scenarios. When a user needs a health care, the user may query relevant remark information in the medical forum. For example, the user may learn some feelings and experiences about treatments and attitude tendency to hospitals, doctors and drugs during a treatment process from the remarks of other patients, and then make a treatment decision based on these information. Further, the doctors and hospitals may also benefit from the feedback information of the patients, for example, the hospitals may improve their service quality, environments, strained doctor-patient relationship and improve their prestige based on these remarks.

Taking the remarks about hospitals and doctors as an example, the user comments may be divided into the following according to their applicable remarked objects: comments used only to evaluate hospitals, for example, "full departments" and the like; comments used only to evaluate doctors, for example, "excellent medical skills" and the like; and comments used to evaluate both hospitals and doctors, for example, "considerate service" and the like. In the present disclosure, the comments used to evaluate different remarked objects are referred to as a common representation; the comments used only to evaluate a single remarked object are referred to as a single representation.

Semantic classification may be performed on those remarks about hospitals and doctors according to their remark contents, for example, the remarks may be divided into excellent remark, good remark, and poor remark and the like. When semantic classification is performed on the remarks about hospitals and doctors, if the common representations and the single representations in the remarks can be extracted to perform semantic classification based on more effective information, the objectivity and accuracy of the remark analyses can be improved.

It should be noted that in the present disclosure, the two remarked objects hospital and doctor are defined as mutually associated remarked objects, that is, the hospital is an associated remarked object of the doctor, and the doctor is an associated remarked object of the hospital. Similarly, other mutually associated remarked objects may also include school and teacher, and takeout platform and takeout merchant and the like. For example, there may be a particular mutual dependence relationship between two associated remarked objects which is not limited herein. For example, one remarked object is a component (for example, employee), service provider or a supplier (for example, takeout service) and the like of the other remarked object. For another example, good or bad remark of one of two associated remarked objects may reflect, to some extent, good or bad remark of the other of the two associated remarked objects.

At least one embodiment of the present disclosure provides a semantic classification method, including: inputting a first remark relating to a first object; extracting a first common representation vector for representing a common representation in the first remark by processing the first remark using a common representation extractor; extracting a first single representation vector for representing a single representation in the first remark by processing the first remark using a first representation extractor; obtaining a first representation vector by splicing the first common representation vector and the first single representation vector; and obtaining a semantic classification of the first remark by processing the first representation vector using a first semantic classifier; where the common representation includes an intention representation which is used to remark on both the first object and a second object, the second object is an associated remarked object different from the first object, and the single representation in the first remark includes an intention representation which is only used to remark on the first object.

Some embodiments of the present disclosure further provide a semantic classification apparatus corresponding to the above-mentioned semantic classification method, a method of training a neural network, an apparatus corresponding to the method of training a neural network and a storage medium.

In the semantic classification method according to at least one embodiment of the present disclosure, a common representation and a single representation in the first remark relating to the first object can be extracted, and semantic classification can be performed on the first remark based on the common representation and the single representation, thereby improving the objectivity and accuracy of the remark analysis.

Some embodiments and their examples of the present disclosure will be detailed below in combination with accompanying drawings.

Figure 2:
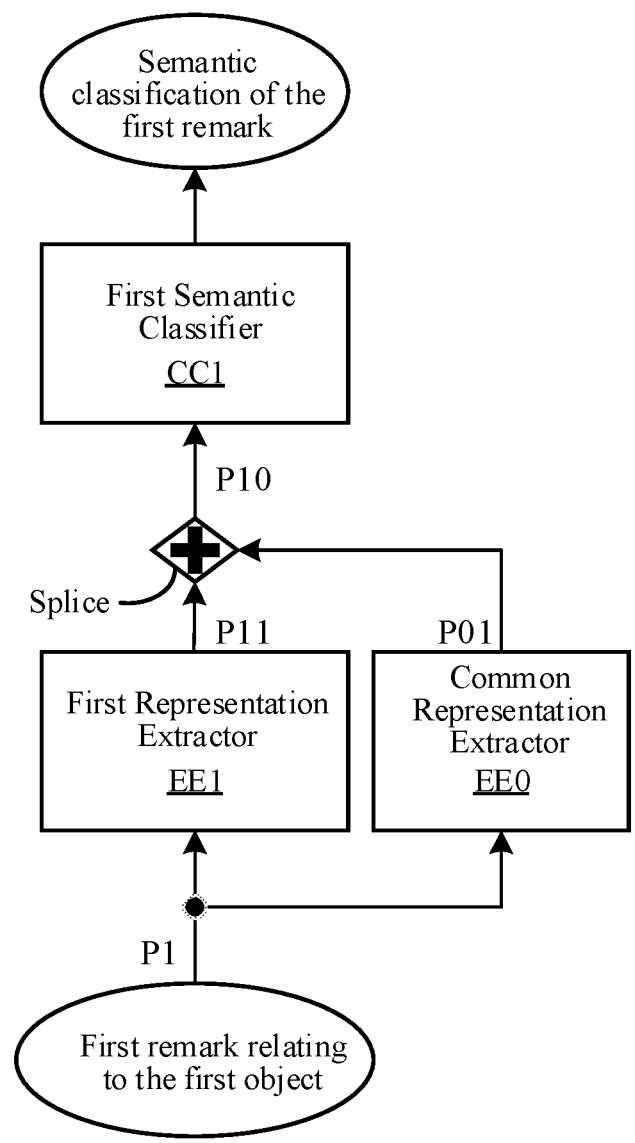
FIG. 2 is an illustrative flow block diagram of the semantic classification method shown in FIG. 1.

FIG. 1 is a flowchart of a semantic classification method according to at least one embodiment of the present disclosure. FIG. 2 is an illustrative flow block diagram of the semantic classification method shown in FIG. 1.

For example, as shown in FIG. 1, the semantic classification method includes steps S110 to S150. The semantic classification method shown in FIG. 1 will be detailed below in combination with FIG. 2.

At step S110, a first remark relating to a first object is input.

For example, in step S110, the first object may be any remarked object, for example, hospital, doctor, school, teacher, takeout platform, takeout merchant and the like, which is not limited in the embodiments of the present disclosure. For example, the first remark may come from a forum relating to the first object and the like.

For example, a corpus source of the first remark may include text, voice, picture (for example, emotion icon) and the like. For example, the voice and the picture and the like may be converted into text manually or by artificial intelligence.

For example, a language of the first remark may include Chinese, English, Japanese, German, and Korean and the like, which is not limited in the embodiments of the present disclosure. For example, in some examples, the semantic classification method may process one or more predetermined languages, and the first remark of other languages (not belonging to the one or more predetermined languages) may be processed after being translated (for example, translated into a predetermined language).

For example, in some examples, as shown in FIG. 2, inputting the first remark relating to the first object at step S110 may include: mapping the first remark as a first original vector P1. Thus, the processing for the first remark in the subsequent steps means processing for the first original vector P1. For example, each word in the first remark may be mapped as a vector with a specified length based on word vector algorithm (e.g. deep neural network, word2vec program and the like), so that the first original vector P1 includes all vectors obtained by mapping all words in the first remark. For example, the length of the vector corresponding to each word is same. It should be noted that in the embodiments of the present disclosure, the length of the vector refers to a number of elements included in the vector.

For example, taking one first remark including n words (x1, x2, . . . , xn) as an example, the n words in the first remark may be mapped as vectors Vx1, Vx2, . . . , Vxn based on word vector algorithm, so as to obtain the first original vector P1 (Vx1, Vx2, . . . , Vxn), where Vx1, Vx2, . . . , Vxn have same length. It is noted that mathematically, the first original vector is in a matrix form.

At step S120, a first common representation vector for representing a common representation in the first remark is extracted by processing the first remark using a common representation extractor.

For example, at step S120, the common representation extractor may adopt a model based on sample relationship of time sequence, which, for example, includes but not limited to Recurrent Neural Network (RNN), Long Short Term Memory (LSTM) network, Bi-directional Long Short Term Memory (Bi-LSTM) network and the like.

For example, in some examples, as shown in FIG. 2, after the first remark is mapped as the first original vector P1, the first common representation vector P01 is obtained by processing the first original vector P1 using the common representation extractor EE0. For example, if the common representation extractor EE0 adopts the LSTM model, the LSTM includes a plurality of processing cells connected in sequence, n vectors Vx1, Vx2, . . . , Vxn in the first original vector P1 (Vx1, Vx2, . . . , Vxn) are taken as inputs of the first n processing cells of the LSTM respectively, and the output of the n-th processing cell of the LSTM is the first common representation vector P01. It is noted that a number of processing cells included in the LSTM is greater than or equal to a number of words of the longest first remark processed by the LSTM.

For example, the common representation includes an intention representation which is used to remark on both the first object and the second object, where the second object is an associated remarked object different from the first object. For example, in some examples, the first object may be hospital and the second object may be doctor, in this case, the common representation includes comments which are used to evaluate both the hospital and the doctor, for example, "considerate service" and "clean" and the like, or comments that cannot be identified for evaluating the hospital or the doctor unless referring to context.

For example, the common representation extractor EE0 may be trained by a training method described subsequently, so as to achieve the function of extracting the common representation in the first remark and the second remark. It is noted that the embodiments of the present disclosure include but are not limited thereto.

At step S130, a first single representation vector for representing a single representation in the first remark is extracted by processing the first remark using a first representation extractor.

For example, at step S130, the first representation extractor may also adopt a model based on sample relationship of time sequence, which includes Recurrent Neural Network (RNN), Long Short Term Memory (LSTM) network and Bi-directional Long Short Term Memory (Bi-LSTM) network and the like. For example, the first representation extractor may adopt a model of the same type as the common representation extractor.

For example, in some examples, as shown in FIG. 2, after the first remark is mapped as the first original vector P1, the first single representation vector P11 may be extracted by processing the first original vector P1 using the first representation extractor EE1. For example, the process in which the first representation extractor EE1 processes the first original vector P1 may be referred to the process in which the common representation extractor EE0 processes the first original vector P1 and thus will not be repeated herein.

For example, the single representation in the first remark includes an intention representation used only to remark on the first object, that is, the intention representation is not used to remark on the second object (i.e. an associated remarked object different from the first object). For example, in some examples, the first object may be hospital and the second object may be doctor, in this case, the single representation in the first remark includes comments only used to evaluate the hospital rather than the doctor, for example, "full departments" and "advanced equipment" and the like.

It is noted that in the embodiments of the present disclosure, the first single representation vector P11 includes information of the single representation in the first remark. In addition, the first single representation vector P11 may also include (of course, or not include) information of the common representation in the first remark. It is noted that the embodiments of the present disclosure are not limited herein.

For example, the first representation extractor EE1 may be trained by a training method described subsequently, so as to achieve the function of extracting the single representation in the first remark. It is noted that the embodiments of the present disclosure include but are not limited thereto.

At step S140, a first representation vector is obtained by splicing the first common representation vector and the first single representation vector.

For example, as shown in FIG. 2, the first representation vector P10 is obtained by splicing the first common representation vector P01 and the first single representation vector P11. Assuming that the first common representation vector P01 includes s elements (a1, a2, . . . , as) and the first single representation vector P11 includes t elements (b1, b2, bt), the first common representation vector P01 and the first single representation vector P11 can be spliced together by splicing the s+t elements in a predetermined sequence. For example, the first representation vector P10 may be obtained by splicing the s+t elements into the form of (a1, . . . , as, b1, . . . , bt) or (b1, . . . , bt, a1, . . . , as) or the like. It is noted that the arrangement sequence of the various elements in the first representation vector P10 is not limited in the embodiments of the present disclosure as long as the first representation vector P10 includes all elements of the first common representation vector P01 and the first single representation vector P11.

At step S150, a semantic classification of the first remark is obtained by processing the first representation vector using a first semantic classifier.

For example, as shown in FIG. 2, the semantic classification of the first remark is obtained by processing the first representation vector P10 using the first semantic classifier CC1. For example, the first semantic classifier CC1 may include a softmax classifier which includes, for example, a fully-connected layer. For example, a K-dimension (i.e. including K elements corresponding to K class labels) vector z is obtained by processing the first representation vector using the fully-connected layer, and the element in the vector z may be any real number. The softmax classifier may compress the K-dimension vector z into a K-dimension vector. The formula of the softmax classifier is expressed as follows:

$$\sigma(z)_j = \frac{e^{z_j}}{\sum_{k=1}^{K} e^{z_k}}, j = 1, 2, \ldots, K$$

where $Z_j$ represents the j-th element in the K-dimension vector z, $\sigma(z)$ represents a prediction probability of each class label, $\sigma(z)$ is a real number in the range of (0, 1), and a sum of K-dimension vector $\sigma(z)$ is 1. Based on the above formula, each class label in the K-dimension vector z is given a certain prediction probability, and the class label with the largest prediction probability is selected as the class label of the semantic classification.

It should be noted that a type number of the class labels of the semantic classification is K, for example, K is an integer greater than or equal to 2. For example, in some examples, K=3, such that the first remark may be divided into, for example, excellent remark, good remark and poor remark. It is noted that the embodiments of the present disclosure include but are not limited thereto.

For example, the first semantic classier CC1 may be trained by a training method described subsequently, so as to achieve the function of the above-mentioned semantic classification. It is noted that the embodiments of the present disclosure include but are not limited thereto.

Figure 3:
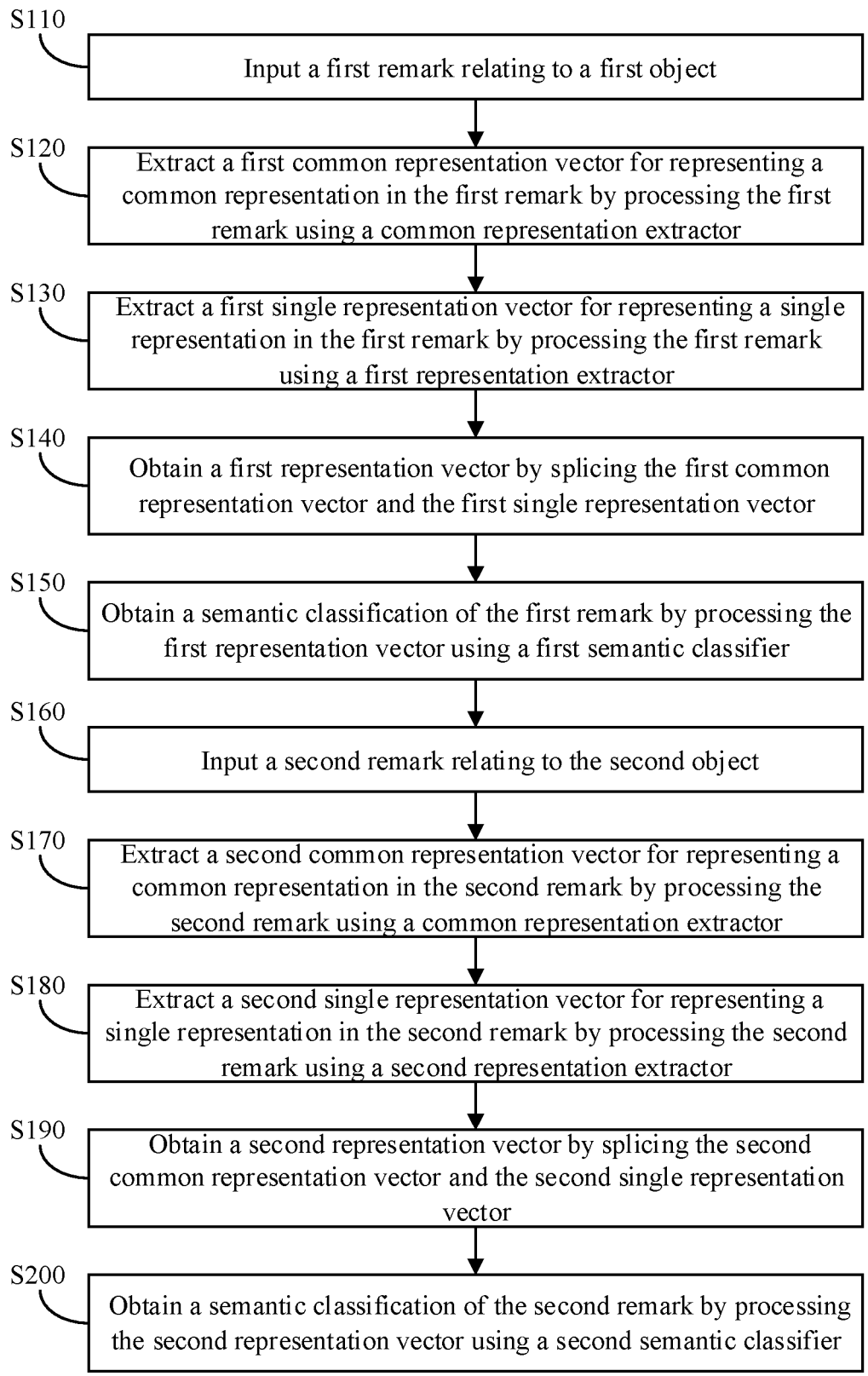
FIG. 3 is a flowchart of another semantic classification method according to at least one embodiment of the present disclosure.
Figure 4:
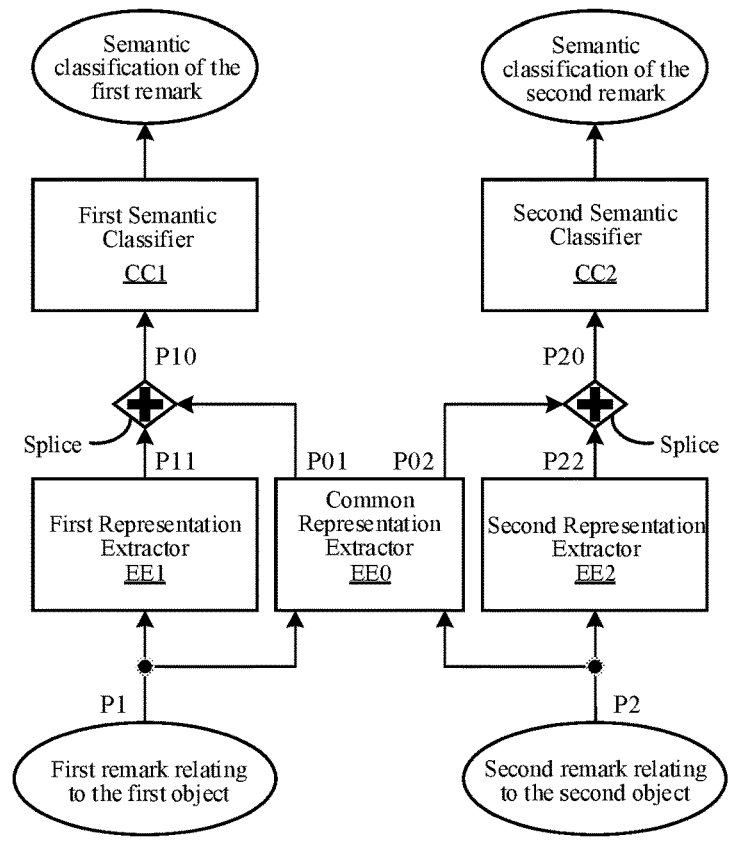
FIG. 4 is an illustrative flow block diagram of the semantic classification method shown in FIG. 3.

FIG. 3 is a flowchart of another semantic classification method according to at least one embodiment of the present disclosure. FIG. 4 is an illustrative flow block diagram of the semantic classification method shown in FIG. 3.

For example, as shown in FIG. 3, based on the semantic classification method shown in FIG. 1, the semantic classification method shown in FIG. 3 further includes steps S160-S200. It is noted that the operations of the steps S160-S200 in the semantic classification method shown in FIG. 3 are basically similar to the operations of steps S110-S150 except that: the steps S110-S150 are used to perform semantic classification on the first remark relating to the first object, and the steps S160-S200 are used to perform semantic classification on the second remark relating to the second object, where the first object and the second object are mutually associated remarked objects. Thus, the detailed descriptions of the steps S160-S200 may be referred to the relevant descriptions of the steps S110-S150.

The steps S160-S200 of the semantic classification method shown in FIG. 3 are described below in combination with FIG. 4.

At step S160, a second remark relating to the second object is input.

For example, at step S160, the second object is an associated remarked object different from the first object. For example, when the first object is hospital, the second object may be a remarked object relating to the hospital, such as doctor or drug or the like; or, when the first object is doctor, the second object may be a remarked object relating to the doctor, such as hospital or drug or the like. It is noted that the embodiments of the present disclosure include but are not limited thereto. For example, one of the first object and the second object may also be school, takeout platform and the like, and correspondingly, the other of the first object and the second object may be teacher, takeout merchant or the like. In other words, the first object and the second object should be mutually associated remarked objects. For example, the second remark may come from a forum relating to the second object or the like. For example, in some examples, the first remark and the second remark may come from a same forum or the like.

For example, similar to the first remark, a corpus source of the second remark may also be text, voice and picture and the like. For example, the voice, and the picture and the like may be converted into text manually or by artificial intelligence. For example, a language of the second remark may include Chinese, English, Japanese, German, and Korean and the like, which is not limited in the embodiments of the present disclosure. For example, in some examples, the semantic classification method may process one or more predetermined languages, and the second remark of other languages (not belonging to the one or more predetermined languages) may be processed after being translated (for example, translated into a predetermined language).

For example, in some examples, as shown in FIG. 4, inputting the second remark relating to the second object at step S160 may include: mapping the second remark as a second original vector P2. Thus, the processing for the second remark in the subsequent steps means processing for the second original vector P2. For example, each word in the second remark may be mapped as a vector with a specified length based on word vector algorithm (e.g. deep neural network, word2vec program and the like), so that the second original vector P2 includes all vectors obtained by mapping all words in the second remark. For example, the length of the vector corresponding to each word in the second remark is identical to the length of the vector corresponding to each word in the first remark.

At step S170, a second common representation vector for representing a common representation in the second remark is extracted by processing the second remark using a common representation extractor.

For example, as shown in FIG. 4, the common representation extractor EE0 used in the step S120 may also be used in the step S170, that is, the common representation extractor EE0 may also process the second remark, so as to extract the second common representation vector P02 for representing the common representation in the second remark.

For example, in some examples, as shown in FIG. 4, after the second remark is mapped as the second original vector P2, the second common representation vector P02 is obtained by processing the second original vector P2 using the common representation extractor EE0. For example, the process in which the common representation extractor EE0 processes the second original vector P2 may be referred to the process in which the common representation extractor EE0 processes the first original vector P1 and thus will not be repeated herein. It is noted that with the common representation extractor EE0 adopting the LSTM model as an example, a number of processing cells included in the LSTM is also greater than or equal to a number of words of the longest second remark processed by the LSTM.

At step S180, a second single representation vector for representing a single representation in the second remark is extracted by processing the second remark using a second representation extractor.

For example, at step S180, the second representation extractor may also adopt a model based on sample relationship of time sequence, for example, Recurrent Neural Network (RNN), Long Short Term Memory (LSTM) network, Bi-directional Long Short Term Memory (Bi-LSTM) network and the like. For example, the second representation extractor may adopt a model of the same type as the common representation extractor.

For example, in some examples, as shown in FIG. 4, after the second remark is mapped as the second original vector P2, the second single representation vector P22 may be extracted by processing the second original vector P2 using the second representation extractor EE2. For example, the process in which the second representation extractor EE2 processes the second original vector P2 may be referred to the process in which the common representation extractor EE0 processes the first original vector P1 and thus will not be repeated herein.

For example, the single representation in the second remark includes an intention representation used only to remark on the second object, that is, the intention representation is not used to remark on the first object (i.e. an associated remarked object different from the second object). For example, in some examples, the first object may be hospital and the second object may be doctor, in this case, the single representation in the second remark includes comments only used to evaluate the doctor rather than the hospital, for example, "excellent medical skills" and "kind tone" and the like.

It is noted that in the embodiments of the present disclosure, the second single representation vector P22 includes information of the single representation in the second remark. In addition, the second single representation vector P22 may also include (of course, or not include) information of the common representation in the second remark. It is noted that the embodiments of the present disclosure are not limited herein.

For example, the second representation extractor EE2 may be trained by a training method described subsequently, so as to achieve the function of extracting the single representation in the second remark. It is noted that the embodiments of the present disclosure include but are not limited thereto.

At step S190, a second representation vector is obtained by splicing the second common representation vector and the second single representation vector.

For example, as shown in FIG. 4, the second representation vector P20 is obtained by splicing the second common representation vector P02 and the second single representation vector P22. For example, the splicing process and details of the step S190 may be referred to the splicing process and details of the step S140 and will not be repeated herein.

At step S200, a semantic classification of the second remark is obtained by processing the second representation vector using a second semantic classifier.

For example, as shown in FIG. 4, the semantic classification of the second remark is obtained by processing the second representation vector P20 using the second semantic classifier CC2. For example, the second semantic classifier CC2 may include a softmax classifier which includes, for example, a fully-connected layer. For example, the processing process and details of the second semantic classifier CC2 may be referred to the processing process and details of the first semantic classifier CC1 and will not be repeated herein.

It is noted that in the embodiments of the present disclosure, the common representation extractor EE0, the first representation extractor EE1 and the second representation extractor EE2 may perform similar functions and may have same or similar construction except for different parameters. Similarly, the first semantic classifier CC1 and the second semantic classifier CC2 may perform similar functions and have same or similar construction except for different parameters. It is noted that in the embodiments of the present disclosure, the common representation extractor EE0, the first representation extractor EE1, the second representation extractor EE2, the first semantic classifier CC1 and the second semantic classifier CC2 may be implemented by software, hardware, firmware or any combination thereof, so as to respectively perform corresponding processing processes.

It is noted that in the embodiments of the present disclosure, the flow of the above-mentioned semantic classification method may include more or fewer operations (for example, in the semantic classification method shown in FIG. 3, only the operations of steps S110-S150 are performed, or only the operations of steps S160-S200 are performed), and these operations may be performed sequentially or in parallel (for example, the steps S120 and S130 may be performed in parallel or sequentially in any order). Although the flow of the semantic classification method described above includes multiple operations appearing in a particular sequence, it should be clearly understood that the sequence of the multiple operations is not limited. The semantic classification method described above may be performed once or performed several times based on a predetermined condition.

It is noted that in some embodiments of the present disclosure, when the first remark/second remark is mapped as the first original vector/second original vector, words irrelevant to the semantic classification (e.g. stop words and the like) in the first remark/second remark may be firstly filtered out, and then remaining words relating to the semantic classification in the first remark/second remark are mapped as the first original vector/second original vector. In some other embodiments of the present disclosure, the common representation extractor EE0, the first representation extractor EE1 and the second representation extractor EE2 which are trained by a particular training method may filter out words irrelevant to the semantic classification when extracting the intention representation. It is noted that the embodiments of the present disclosure are not limited herein.

In the semantic classification method according to the embodiments of the present disclosure, a common representation and a single representation in the first remark relating to the first object can be extracted, and semantic classification can be perform on the first remark based on the common representation and the single representation, thereby improving the objectivity and accuracy of the remark analysis.

Figure 5:
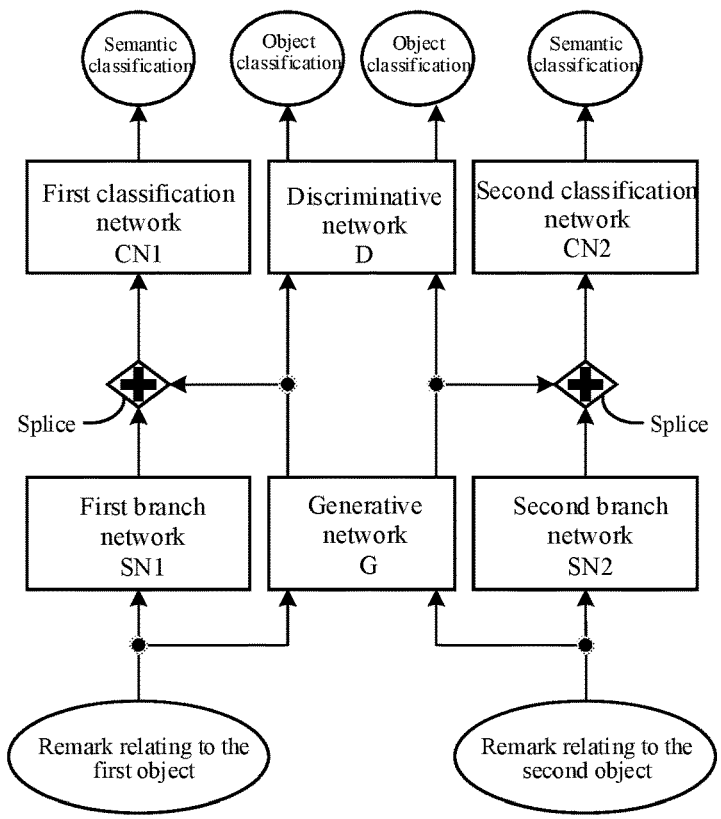
FIG. 5 is an illustrative architecture block diagram of a neural network according to at least one embodiment of the present disclosure.
Figure 6:
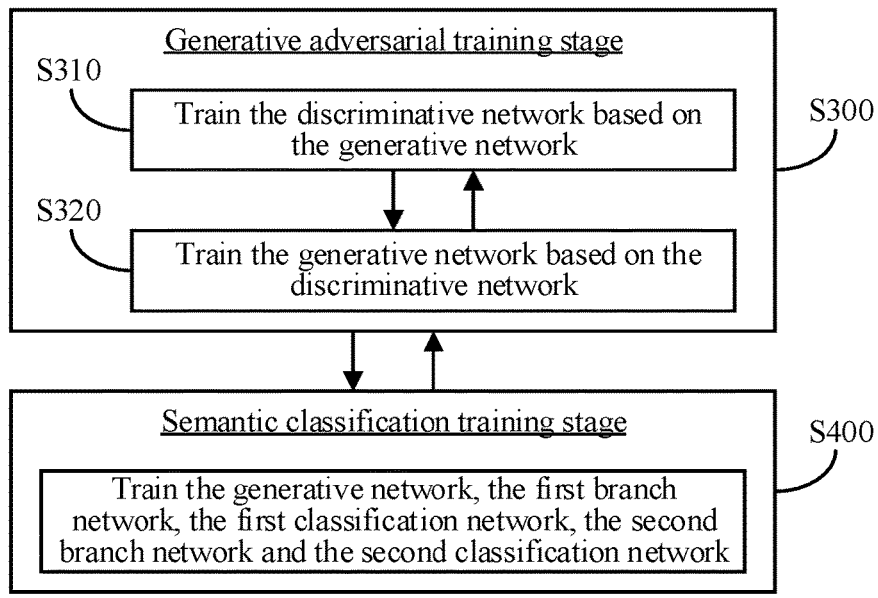
FIG. 6 is a flowchart of a method of training a neural network according to at least one embodiment of the present disclosure.

At least one embodiment of the present disclosure further provides a method of training a neural network. FIG. 5 is an illustrative architecture block diagram of a neural network according to at least one embodiment of the present disclosure. FIG. 6 is a flowchart of a method of training a neural network according to at least one embodiment of the present disclosure.

For example, as shown in FIG. 5, the neural network includes a generative network G, a discriminative network D, a first branch network SN1, a first classification network CN1, a second branch network SN2, and a second classification network CN2. For example, as shown in FIG. 6, the training method includes: a generative adversarial training stage S300 and a semantic classification training stage S400, and obtaining a trained neural network by performing the two stages of trainings alternately. For example, after the neural network is trained, the generative network G, the first branch network SN1, the first classification network CN1, the second branch network SN2, and the second classification network CN2 in the neural network may be used to implement the functions of the common representation extractor EE0, the first representation extractor EE1, the first semantic classifier CC1, the second representation extractor EE2 and the second semantic classifier CC2 in the above-mentioned semantic classification method respectively, so as to perform the above-mentioned semantic classification method.

For example, as shown in FIG. 6, the generative adversarial training stage S300 includes the following steps.

At step S310, the discriminative network is trained based on the generative network.

At step S320, the generative network is trained based on the discriminative network.

The above-mentioned two training processes (i.e. step S310 and step S320) are performed alternately, so as to complete a training of the generative adversarial training stage S300.

For example, the construction of the generative network G may be same as the construction of the above-mentioned common representation extractor EE0, and thus the construction details and working principle of the generative network G may be referred to the relevant descriptions of the above-mentioned common representation extractor EE0 and will not be repeated herein. For example, as shown in FIG. 5, the generative network G is used to process both the remark relating to the first object and the remark relating to the second object so as to extract the intention representation in the remark, where the first object and the second object are mutually associated remarked objects.

For example, the discriminative network D may adopt a binary classification softmax classifier, for example, the binary classification softmax classifier may be referred to the above relevant descriptions of the softmax classifier (let K=2) and will not be repeated herein. For example, as shown in FIG. 5, the discriminative network D is used to determine whether the intention representation extracted by the generative network G is used to remark on the first object or the second object.

Figure 7:
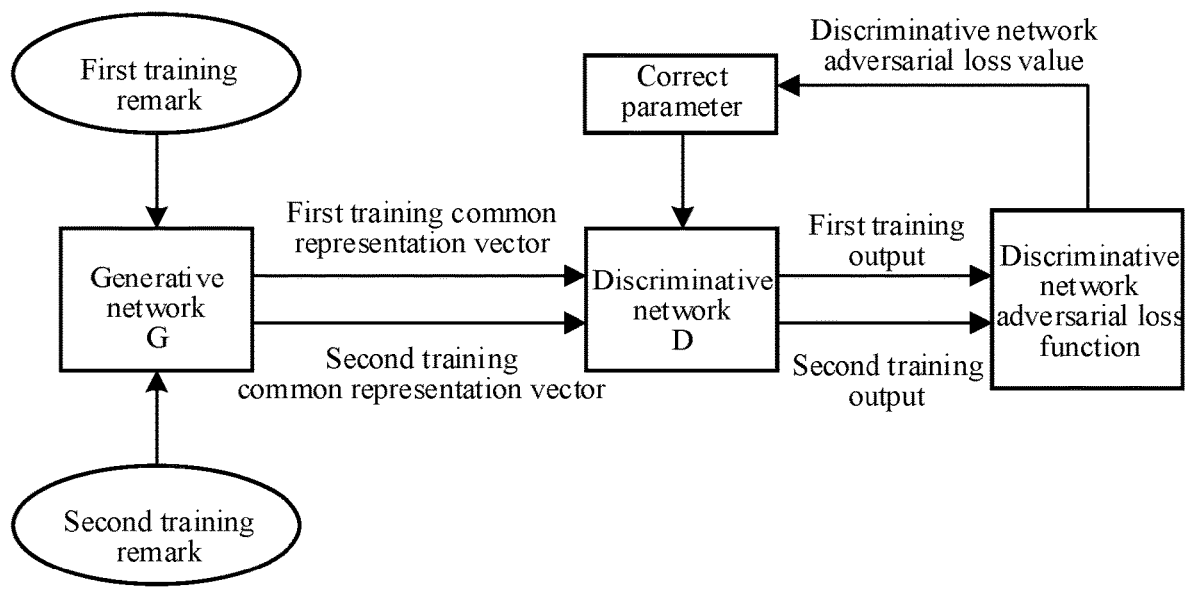
FIG. 7 is an illustrative training architecture block diagram of a discriminative network in a generative adversarial training stage corresponding to the training method shown in FIG. 6 according to at least one embodiment of the present disclosure.
Figure 8:
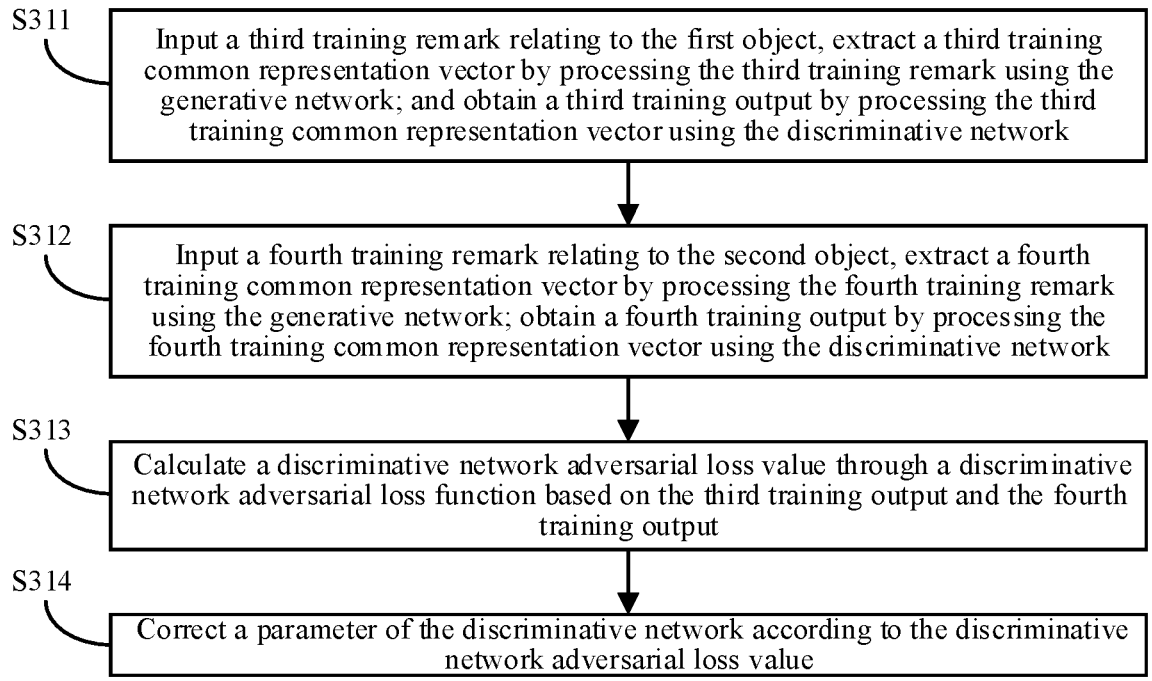
FIG. 8 is an illustrative flowchart of a process of training a discriminative network according to at least one embodiment of the present disclosure.

FIG. 7 is an illustrative training architecture block diagram of a discriminative network in a generative adversarial training stage corresponding to the training method shown in FIG. 6 according to at least one embodiment of the present disclosure. FIG. 8 is an illustrative flowchart of a process of training a discriminative network according to at least one embodiment of the present disclosure.

For example, as shown in FIGS. 7 and 8, training the discriminative network based on the generative network at step S310 includes the steps S311 to S314 below.

At step S311, a third training remark relating to the first object is input, a third training common representation vector is extracted by processing the third training remark using the generative network; and a third training output is obtained by processing the third training common representation vector using the discriminative network.

At step S312, a fourth training remark relating to the second object is input, a fourth training common representation vector is extracted by processing the fourth training remark using the generative network; and a fourth training output is obtained by processing the fourth training common representation vector using the discriminative network.

At step S313, a discriminative network adversarial loss value is calculated through a discriminative network adversarial loss function based on the third training output and the fourth training output.

At step S314, a parameter of the discriminative network is corrected according to the discriminative network adversarial loss value.

For example, training the discriminative network based on the generative network at step S310 further includes: determining whether the training of the discriminative network satisfies a preset condition; if the training does not satisfy the preset condition, the above-mentioned training process of the discriminative network is repeated; if the training satisfies the preset condition, the training process of the discriminative network in this stage is stopped to obtain a discriminative network trained in this stage. For example, in some examples, the preset condition is that the discriminative network adversarial loss values corresponding to two successive pairs of remarks (for example, in a process of training a discriminative network, each pair of remarks includes one third training remark and one fourth training remark) are not significantly reduced any more. For example, in some other embodiments, the preset condition is that the number of training times or training cycle of the discriminative network reaches a predetermined number, which is not limited in the embodiments of the present disclosure.

For example, as shown in FIG. 7, in a training process of the discriminative network D, the discriminative network D needs to be trained jointly with the generative network G. It is noted that the parameter of the generative network G in a training process of the discriminative network D remains unchanged.

It is noted that the above-mentioned example only illustratively describes the training process of the discriminative network. Those skilled in the art should know that in a training stage, the neural network needs to be trained by using a large number of sample remarks (i.e. remarks relating to the first object and remarks relating to the second object); and in a training process for every pair of sample remarks, multiple repetitive iterations may be performed to correct the parameter of the discriminative network. For another example, in a training process of the discriminative network, the parameter of the discriminative network may also be fine-tuned to obtain more optimized parameter.

For example, an initial parameter of the discriminative network D may be a random number, and for example, the random number complies with Gaussian distribution. For example, the initial parameter of the discriminative network D may also be a trained parameter in a common database in the prior art, which is not limited in the embodiments of the present disclosure.

For example, the training process of the discriminative network D may also include an optimization function (not shown in FIG. 7). The optimization function may calculate an error value of the parameter of the discriminative network D based on the discriminative network adversarial loss value obtained through the discriminative network adversarial loss function, and correct the parameter of the discriminative network D based on the error value. For example, the optimization function may adopt stochastic gradient descent (SGD) algorithm, or batch gradient descent (BGD) algorithm or the like to calculate the error value of the parameter of the discriminative network D.

For example, the third training remark comes from a remark sample set of the first object; for example, each remark in the remark sample set of the first object has already been subjected to semantic classification (for example, performing semantic classification manually or the like) in advance and has a definite class label of semantic classification. For example, the class label of semantic classification in the remark sample set of the first object includes excellent remark, good remark and poor remark, the embodiments of the present disclosure include but are not limited thereto. For example, the fourth training remark comes from a remark sample set of the second object; for example, each remark in the remark sample set of the second object has already been subjected to semantic classification (for example, performing semantic classification manually or the like) in advance and has a definite class label of semantic classification. For example, the class label of semantic classification in the remark sample set of the second object includes excellent remark, good remark and poor remark, the embodiments of the present disclosure include but are not limited thereto.

For example, in some examples, the third training remark and the fourth training remark may be mapped as an original vector respectively based on word vector algorithm, and the original vectors corresponding to the third training remark and the fourth training remark may be processed by the generative network G respectively. The processing process and details of the generative network G may be referred to the processing process and details of the above-mentioned common representation extractor EE0 and thus will not be repeated herein.

For example, in some examples, the discriminative network adversarial loss function may be expressed as:

$$L_D = -E_{z1 \sim P_{data}(z1)}[\log D(G(z1))] - E_{z2 \sim P_{data}(z2)}[1 - \log D(G(z2))]$$

where $L_D$ represents the discriminative network adversarial loss function, z1 represents the third training remark, $P_{data}(z1)$ represents a set of third training remarks, $G(z1)$ represents the third training common representation vector, $D(G(z1))$ represents the third training output, $E_{z1 \sim P_{data}(z1)}$ represents an expectation value for the set of the third training remarks, z2 represents the fourth training remark, $P_{data}(z2)$ represents a set of the fourth training remarks, $G(z2)$ represents the fourth training common representation vector, $D(G(z2))$ represents the fourth training output, $E_{z2 \sim P_{data}(z2)}$ represents an expectation value for the set of the fourth training remarks. Therefore, parameter optimization may be performed on the discriminative network D based on batch gradient descent algorithm.

It is noted that the discriminative network adversarial loss function expressed by the above-mentioned formula is illustrative, which is not limited in the embodiments of the present disclosure.

The training of the discriminative network D aims to minimize the discriminative network adversarial loss value. For example, in a training process of the discriminative network D, an object label of the third training remark is set to 1, that is, the discriminative network D is needed to verify the third training common representation vector comes from the remark relating to the first object. At the same time, an object label of the fourth training remark is set to 0, that is, the discriminative network D is needed to verify the fourth training common representation vector comes from the remark relating to the second object. That is, the training of the discriminative network D aims to enable the discriminative network D to accurately determine a true source of the intention representation extracted by the generative network G (i.e. comes from the remark relating to the first object or the remark relating to the second object), which also means to enable the discriminative network D to accurately determine the intention representation extracted by the generative network G is used to remark on the first object or the second object.

For example, in a training process of the discriminative network D, the parameter of the discriminative network D can be corrected continuously, so that the discriminative network D having the corrected parameter can accurately verify the source of the third training common representation vector and the fourth training common representation vector, That is, the output of the discriminative network D corresponding to the third training remark can be continuously approximate to 1 and the output of the discriminative network D corresponding to the fourth training remark can be continuously approximate to 0, so as to continuously reduce the generative network adversarial loss value.

Figure 9:
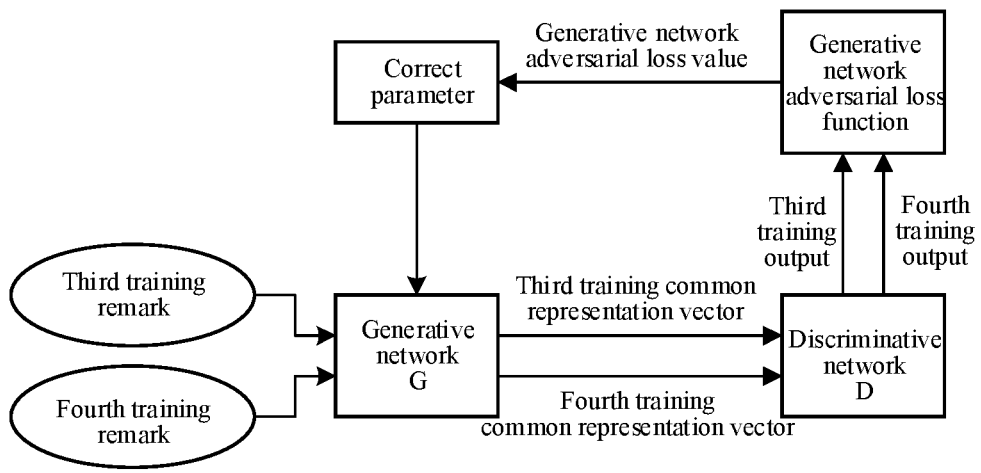
FIG. 9 is a an illustrative training architecture block diagram of a generative network in a generative adversarial training stage corresponding to the training method shown in FIG. 6 according to at least one embodiment of the present disclosure.
Figure 10:
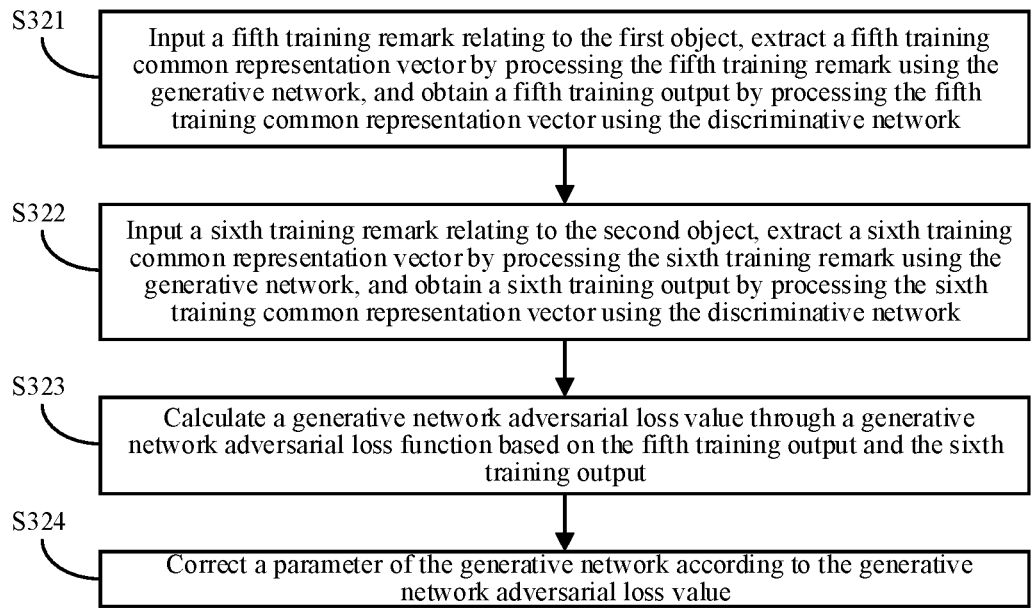
FIG. 10 is an illustrative flowchart of a process of training a generative network according to at least one embodiment of the present disclosure.

FIG. 9 is a an illustrative training architecture block diagram of a generative network in a generative adversarial training stage corresponding to the training method shown in FIG. 6 according to at least one embodiment of the present disclosure. FIG. 10 is an illustrative flowchart of a process of training a generative network according to at least one embodiment of the present disclosure.

For example, as shown in FIGS. 9 and 10, training the generative network based on the discriminative network at step S320 includes the steps S321 to S324.

At step S321, a fifth training remark relating to the first object is input, a fifth training common representation vector is extracted by processing the fifth training remark using the generative network, and a fifth training output is obtained by processing the fifth training common representation vector using the discriminative network.

At step S322, a sixth training remark relating to the second object is input, a sixth training common representation vector is extracted by processing the sixth training remark using the generative network, and a sixth training output is obtained by processing the sixth training common representation vector using the discriminative network.

At step S323, a generative network adversarial loss value is calculated through a generative network adversarial loss function based on the fifth training output and the sixth training output.

At step S324, a parameter of the generative network is corrected according to the generative network adversarial loss value.

For example, training the generative network based on the discriminative network at step S320 further includes: determining whether the training of the generative network satisfies a preset condition; if the training does not satisfy the preset condition, the above-mentioned training process of the generative network is repeated; if the training satisfies the preset condition, the training process of the generative network in this stage is stopped to obtain a generative network trained in this stage. For example, in some examples, the preset condition is that the discriminative network adversarial loss values corresponding to two successive pairs of remarks (for example, in a process of training a generative network, each pair of remarks includes one fifth training remark and one sixth training remark) are not significantly reduced any more. For example, in some other embodiments, the preset condition is that the number of training times or training cycle of the generative network reaches a predetermined number, which is not limited in the embodiments of the present disclosure.

For example, as shown in FIG. 9, in a training process of the generative network G, the generative network G needs to be trained jointly with the discriminative network D. It is noted that the parameter of the discriminative network D in a training process of the generative network G remains unchanged.

It is noted that the above-mentioned example only illustratively describes the training process of the generative network. Those skilled in the art should know that in a training stage, the neural network needs to be trained by using a large number of sample remarks (i.e. remarks relating to the first object and remarks relating to the second object); and in a training process for every pair of sample remarks, multiple repetitive iterations may be performed to correct the parameter of the generative network. For another example, in a training process of the generative network, the parameter of the generative network may also be fine-tuned to obtain more optimized parameter.

For example, an initial parameter of the generative network G may be a random number, and for example, the random number complies with Gaussian distribution. For example, the initial parameter of the generative network G may also be a trained parameter in a common database in the prior art, which is not limited in the embodiments of the present disclosure.

For example, the training process of the generative network G may also include an optimization function (not shown in FIG. 7). The optimization function may calculate an error value of the parameter of the generative network G based on the generative network adversarial loss value obtained through the generative network adversarial loss function, and correct the parameter of the generative network G based on the error value. For example, the optimization function may adopt stochastic gradient descent (SGD) algorithm, or batch gradient descent (BGD) algorithm or the like to calculate the error value of the parameter of the generative network G.

For example, similar to the third training remark, the fifth training remark also comes from the remark sample set of the first object, which is not limited in the embodiments of the present disclosure. For example, similar to the fourth training remark, the sixth training remark also comes from the remark sample set of the second object, which is not limited in the embodiments of the present disclosure.

For example, in some examples, the generative network adversarial loss function may be expressed as:

$$L_G = -E_{z3 \sim P_{data}(z3)}[\log D(G(z3))] - E_{z4 \sim P_{data}(z4)}[1-\log D(G(z4))]$$

where $L_G$ represents the generative network adversarial loss function, z3 represents the fifth training remark, $P_{data}(z3)$ represents a set of fifth training remarks, $G(z3)$ represents the fifth training common representation vector, $D(G(z3))$ represents the fifth training output, $E_{z3 \sim P_{data}(z3)}$ represents an expectation value for the set of the fifth training remarks, z4 represents the sixth training remark, $P_{data}(z4)$ represents a set of sixth training remarks, $G(z4)$ represents the sixth training common representation vector, $D(G(z4))$ represents the sixth training output, $E_{z4 \sim P_{data}(z4)}$ represents an expectation value for the set of the sixth training remarks. Therefore, parameter optimization may be performed on the generative network G based on batch gradient descent algorithm.

It is noted that the generative network adversarial loss function expressed by the above-mentioned formula is illustrative, which is not limited in the embodiments of the present disclosure.

The training of the generative network G aims to minimize the generative network adversarial loss value. For example, in a training process of the generative network G, an object label of the fifth training remark is set to 0, that is, the discriminative network D is needed to verify the fifth training common representation vector comes from the remark relating to the second object. At the same time, an object label of the sixth training remark is set to 1, that is, the discriminative network D is needed to verify the sixth training common representation vector comes from the remark relating to the first object. That is, the training of the generative network G aims to disable the discriminative network D from accurately determining a true source of the intention representation extracted by the generative network G (i.e. comes from the remark relating to the first object or the remark relating to the second object), which also means to disable the discriminative network D from accurately determining the intention representation extracted by the generative network G is used to remark on the first object or the second object. For example, the intention representation extracted by the generative network G is a common representation in the remark relating to the first object and the remark relating to the second object, the discriminative network D cannot determine the true source of the intention representation extracted by the generative network G.

For example, in a training process of the generative network G, the parameter of the generative network G can be corrected continuously, so that the intention representation extracted by the generative network G having the corrected parameter is the common representation in the remark relating to the first object and the remark relating to the second object. Thus, the discriminative network D cannot accurately determine the true source of the fifth training common representation vector and the sixth training common representation vector. That is, the output of the discriminative network D corresponding to the fifth training remark can be continuously go away to 1 (i.e. continuously approximate to 0) and the output of the discriminative network D corresponding to the sixth training remark can be continuously go away from 0 (i.e. continuously approximate to 1), so as to continuously reduce the generative network adversarial loss value.

For example, in the embodiments of the present disclosure, the training of the generative network G and the training of the discriminative network D are performed alternately. For example, for untrained generative network G and discriminative network D, the first stage training is firstly performed on the discriminative network D to improve the verification capability (i.e. verify the true source of the input of the discriminative network D) of the discriminative network D, so as to obtain the discriminative network D subjected to the first stage training. Then, the first stage training is performed on the generative network G based on the discriminative network D subjected to the first stage training to improve the capability of the generative network G to extract the common representation in the remark relating to the first object and the remark relating to the second object, so as to obtain the generative network G subjected to the first stage training. Similar to the first stage training, in the second stage training, the second stage training is performed on the discriminative network D subjected to the first stage training based on the generative network G subjected to the first stage training to improve the verification capability of the discriminative network D, so as to obtain the discriminative network D subjected to the second stage training. Then, the second stage training is performed on the generative network G subjected to the first stage training based on the discriminative network D subjected to the second stage training to improve the capability of the generative network G to extract the common representation in the remark relating to the first object and the remark relating to the second object, so as to obtain the generative network G subjected to the second stage training, and so on. Next, the third stage training and the fourth stage training and so on are performed on the discriminative network D and the generative network G until the output of the obtained generative network G is the common representation in the remark relating to the first object and the remark relating to the second object, thus completing the training of one generative adversarial training stage S300.

It should be noted that in the generative adversarial training stage S300 in which the generative network G and the discriminative network D are trained alternately, the adversarial relationship between the generative network G and the discriminative network D is reflected as follows: the outputs of the generative network G corresponding to the remarks relating to the first object (i.e. the third training remark and the fifth training remark) have different object labels in respective training processes (in the training process of the discriminative network D, the object label of the third training remark is 1, and in the training process of the generative network G, the object label of the fifth training remark is 0), and the outputs of the generative network G corresponding to the remarks relating to the second object (i.e. the fourth training remark and the sixth training remark) have different object labels in respective training processes (in the training process of the discriminative network D, the object label of the fourth training remark is 0, and in the training process of the generative network G, the object label of the sixth training remark is 1). Further, the adversarial relationship between the generative network G and the discriminative network D is also reflected in that the discriminative network adversarial loss function and the generative network adversarial loss function are contrary. It is noted that ideally, the intention representation extracted by the trained generative network G is the common representation in the remark relating to the first object and the remark relating to the second object (regardless of whether the input of the generative network G is the remark relating to the first object or the remark relating to the second object), and the output of the discriminative network D for the common representation is 0.5, that is, the generative network G and the discriminative network D reach Nash equilibrium through adversarial gaming.

For example, as shown in FIG. 6, the semantic classification training stage S400 includes: training the generative network, the first branch network, the first classification network, the second branch network and the second classification network.

For example, the construction of the first branch network SN1 may be same as the construction of the above-mentioned first representation extractor EE1, and thus the construction details and working principle of the first branch network SN1 may be referred to the relevant descriptions of the above-mentioned first representation extractor EE1 and will not be repeated herein. For example, as shown in FIG. 5, the first branch network SN1 is used to process the remark relating to the first object, so as to extract the single representation in the remark (whether the common representation in the remark is extracted is not limited herein).

For example, the construction of the second branch network SN2 may be same as the construction of the above-mentioned second representation extractor EE2, and thus the construction details and working principle of the second branch network SN2 may be referred to the relevant descriptions of the above-mentioned second representation extractor EE2 and will not be repeated herein. For example, as shown in FIG. 5, the second branch network SN2 is used to process the remark relating to the second object, so as to extract the single representation in the remark (whether the common representation in the remark is extracted is not limited herein).

For example, the first classification network CN1 and the second classification network CN2 may have the same construction as the above-mentioned first semantic classifier CC1 and second semantic classifier CC2, thus the construction details and working principle of the first classification network CN1 and the second classification network CN2 may be referred to the relevant descriptions of the above-mentioned first semantic classifier CC1 and second semantic classifier CC2 and will not be repeated herein.

Figure 11:
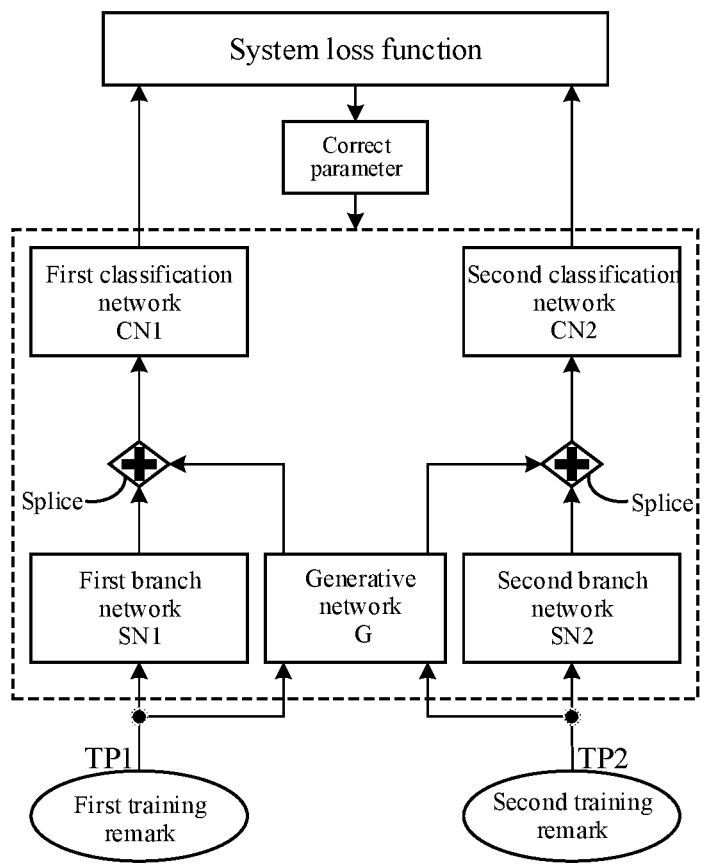
FIG. 11 is a an illustrative training architecture block diagram of a semantic classification training stage corresponding to the training method shown in FIG. 6 according to at least one embodiment of the present disclosure.
Figure 12:
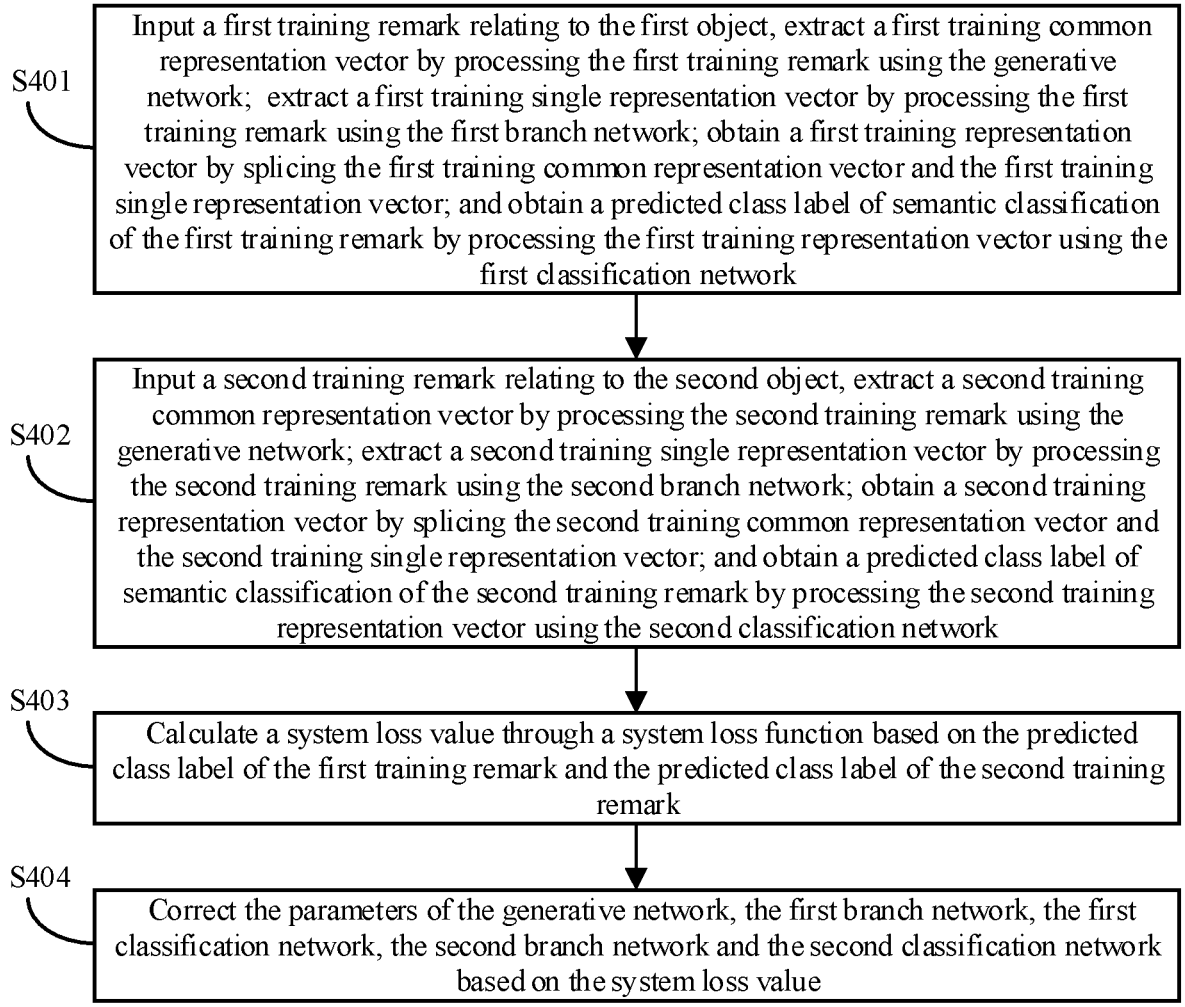
FIG. 12 is an illustrative flowchart of a training process of a semantic classification training stage in a training method according to at least one embodiment of the present disclosure.

FIG. 11 is a an illustrative training architecture block diagram of a semantic classification training stage corresponding to the training method shown in FIG. 6 according to at least one embodiment of the present disclosure. FIG. 12 is an illustrative flowchart of a training process of a semantic classification training stage in a training method according to at least one embodiment of the present disclosure. The training process of the semantic classification training stage S400 will be detailed below in combination with the FIGS. 11 and 12.

For example, as shown in FIGS. 11 and 12, the semantic classification training stage S400 includes the steps S401 to S405.

At step S401, a first training remark relating to the first object is input, a first training common representation vector is extracted by processing the first training remark using the generative network; a first training single representation vector is extracted by processing the first training remark using the first branch network; a first training representation vector is obtained by splicing the first training common representation vector and the first training single representation vector; and a predicted class label of semantic classification of the first training remark is obtained by processing the first training representation vector using the first classification network.

For example, similar to the third training remark and the fifth training remark, the first training remark also comes from the remark sample set of the first object, which is not limited herein. For example, the first training remark has a definite class label T1 of semantic classification (i.e. true class label), and for example, the true class label is expressed in the form of vector. For example, if a total number of class labels of semantic classification is K, the true class label is one K-dimension vector; when the k-th element of the K-dimension vector is 1 and other elements are 0, the K-dimension vector represents the k-th true class label, where k is an integer and 1<k<K.

For example, in some examples, as shown in FIG. 11, inputting the first training remark relating to the first object may include: mapping the first training remark as a first training original vector TP1. Thus, the processing for the first training remark in the subsequent steps means processing for the first training original vector TP1. For example, each word in the first training remark may be mapped as a vector with a specified length based on word vector algorithm (e.g. deep neural network, word2vec program and the like), so that the first training original vector TP1 includes all vectors obtained by mapping all words in the first training remark. For example, the lengths of the vectors corresponding to various words are same.

For example, the operations of step S401 may be referred to the relevant descriptions of steps S110 to S150 of the above-mentioned semantic classification method and will not be repeated herein.

For example, the predicted class label of the first training remark is a vector having the same dimension as its true class label. For example, the predicted class label of the first training remark may be expressed in the form of the above-mentioned vector, and each element in the vector represents a prediction probability of each class label. For example, the class label having the largest prediction probability is selected as the class label of the semantic classification.

At step S402, a second training remark relating to the second object is input, a second training common representation vector is extracted by processing the second training remark using the generative network; a second training single representation vector is extracted by processing the second training remark using the second branch network; a second training representation vector is obtained by splicing the second training common representation vector and the second training single representation vector; and a predicted class label of semantic classification of the second training remark is obtained by processing the second training representation vector using the second classification network.

For example, similar to the fourth training remark and the sixth training remark, the second training remark also comes from the remark sample set of the second object, which is not limited herein. For example, the second training remark has a definite class label T2 of semantic classification (i.e. true class label), and for example, the true class label T2 of the second training remark is expressed by referring to the expression form of the true class label T1 of the first training remark, which is not repeated herein.

For example, in some examples, as shown in FIG. 11, inputting the second training remark relating to the second object may include: mapping the second training remark as a second training original vector TP2. Thus, the processing for the second training remark in the subsequent steps means processing for the second training original vector TP2. For example, each word in the second training remark may be mapped as a vector with a specified length based on word vector algorithm (e.g. deep neural network, word2vec program and the like), so that the second training original vector TP2 includes all vectors obtained by mapping all words in the second training remark. For example, the length of the vector corresponding to each word in the second training remark is same as the length of the vector corresponding to each word in the first training remark.

For example, the operations of step S402 may be referred to the relevant descriptions of steps S160 to S200 of the above-mentioned semantic classification method and will not be repeated herein.

For example, the predicted class label of the second training remark is a vector having the same dimension as its true class label. For example, the predicted class label of the second training remark may be expressed in the form of the above-mentioned vector, and each element in the vector represents a prediction probability of each class label. For example, the class label having the largest prediction probability is selected as the class label of the semantic classification.

At step S403, a system loss value is calculated through a system loss function based on the predicted class label of the first training remark and the predicted class label of the second training remark.

For example, in some examples, the system loss function may be expressed as:

$$L_{obj} = \lambda_1 \cdot L(Y1,T1) + \lambda_2 \cdot L(Y2,T2)$$

where $L_{obj}$ represents the system loss function, $L(\bullet, \bullet)$ represents a cross entropy loss function, Y1 represents the predicted class label of the first training remark, T1 represents a true class label of the first training remark, $L(Y1,T1)$ represents a cross entropy loss function of the first training remark, $\lambda_1$ represents a weight of the cross entropy loss function $L(Y1,T1)$ of the first training remark in the system loss function, Y2 represents the predicted class label of the second training remark, T1 represents a true class label of the second training remark, $L(Y2,T2)$ represents a cross entropy loss function of the second training remark, $\lambda_2$ represents a weight of the cross entropy loss function $L(Y2,T2)$ of the second training remark in the system loss function.

For example, the cross entropy loss function $L(\bullet, \bullet)$ may be expressed as:

$$L(Y, T) = -\sum_{i=1}^{N}\sum_{j=1}^{K} Y_i^j \log(T_i^j)$$

where Y and T are formal parameters, N represents a number of training remarks (for example, first training remark or the second training remark), K represents a number of class labels of semantic classification, $Y_i^j$ represents a probability value of a j-th class label in predicted class labels of an i-th training remark, and $T_i^j$ represents a probability value of a j-th class label in true class labels of an i-th training remark.

The training of the semantic classification training stage S400 aims to minimize the system loss value. For example, the smaller value of the cross entropy loss function L(Y1, T1) of the first training remark indicates that the predicted class label of the first training remark is more approximate to the true class label of the first training remark, that is, the semantic classification of the first training remark can be more accurate. Similarly, the smaller value of the cross entropy loss function L(Y2,T2) of the second training remark indicates that the predicted class label of the second training remark is more approximate to the true class label of the second training remark, that is, the semantic classification of the second training remark can be more accurate.

At step S404, the parameters of the generative network, the first branch network, the first classification network, the second branch network and the second classification network are corrected based on the system loss value.

For example, initial parameters of the first branch network SN1, the first classification network CN1, the second branch network SN2 and the second classification network CN2 may be random numbers, and for example, the random numbers comply with Gaussian distribution. For example, the initial parameters of the first branch network SN1, the first classification network CN1, the second branch network SN2 and the second classification network CN2 may also be trained parameters in a common database in the prior art, which is not limited in the embodiments of the present disclosure.

For example, the training process of the semantic classification training stage S400 may also include an optimization function (not shown in FIG. 11). The optimization function may calculate error values of the parameters of the generative network G, the first branch network SN1, the first classification network CN1, the second branch network SN2 and the second classification network CN2 based on the system loss value obtained through the system loss function, and correct the parameters of the generative network G, the first branch network SN1, the first classification network CN1, the second branch network SN2 and the second classification network CN2 based on the error values. For example, the optimization function may adopt stochastic gradient descent (SGD) algorithm, or batch gradient descent (BGD) algorithm or the like to calculate the error values of the parameters of the generative network G, the first branch network SN1, the first classification network CN1, the second branch network SN2 and the second classification network CN2.

For example, the semantic classification training stage S400 further includes: determining whether the trainings of the generative network, the first branch network, the first classification network, the second branch network and the second classification network satisfy a preset condition; if the trainings do not satisfy the preset condition, the above-mentioned training process of the semantic classification training stage S400 is repeated; if the trainings satisfy the preset condition, the current training process of the semantic classification training stage S400 is stopped, so as to obtain the generative network, the first branch network, the first classification network, the second branch network and the second classification network which are trained in this stage. For example, in some examples, the preset condition is that the system loss values corresponding to two successive pairs of remarks (for example, in a training process of the semantic classification training stage S400, each pair of remarks includes one first training remark and one second training remark) are not significantly reduced any more. For example, in some other embodiments, the preset condition is that the number of training times or training cycle of the semantic classification training stage S400 reaches a predetermined number, which is not limited in the embodiments of the present disclosure.

It is noted that the above-mentioned example only illustratively describes the training process of the semantic classification training stage S400. Those skilled in the art should know that in a training stage, the neural network needs to be trained by using a large number of sample remarks (i.e. remarks relating to the first object and remarks relating to the second object); and in a training process for every pair of sample remarks, multiple repetitive iterations may be performed to correct the parameter of the generative network. For another example, in a training process of the semantic classification training stage S400, the parameters of the generative network, the first branch network, the first classification network, the second branch network and the second classification network may also be fine-tuned to obtain more optimized parameters.

For example, in the embodiments of the present disclosure, the generative adversarial training stage S300 and the semantic classification training stage S400 are performed alternately, where the generative network G participates in the trainings of the two training stages at the same time. For example, in some examples, the generative adversarial training stage S300 may improve the capability of the generative network G to extract the common representation. However, at the same time, the generative network G may also extract words which are irrelevant to the semantic classification and both used in the first training remark and the second training remark. For example, the semantic classification training stage S400 may enable the generative network G to have a function to filter out the words irrelevant to the semantic classification, thereby improving the accuracy of the semantic classification and increasing the running efficiency of the neural network.

In the method of training a neural network according to the embodiments of the present disclosure, the neural network may be train. The generative network G, the first branch network SN1, the second branch network SN2, the first classification network CN1 and the second classification network CN2 which are trained may be used to respectively implement the functions of the common representation extractor EE0, the first representation extractor EE1, the second representation extractor EE2, the first semantic classifier CC1, and the second semantic classifier CC2 in the above-mentioned semantic classification method, so as to perform the above-mentioned semantic classification method.

Reference may be made to the corresponding descriptions of the semantic classification method in the above-mentioned embodiments for the technical effects of the method of training a neural network according to the embodiments of the present disclosure, and thus redundant descriptions will not be made herein.

Figure 13:
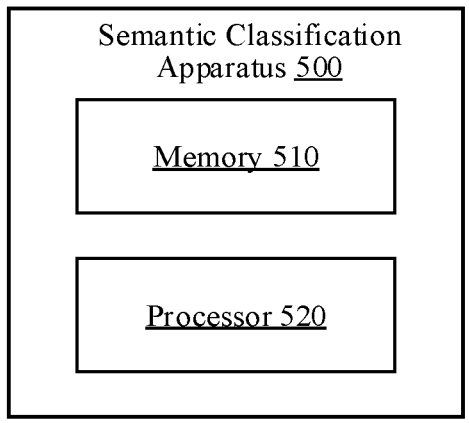
FIG. 13 is an illustrative block diagram of a semantic classification apparatus according to at least one embodiment of the present disclosure.

At least one embodiment of the present disclosure provides a semantic classification apparatus. FIG. 13 is an illustrative block diagram of a semantic classification apparatus according to at least one embodiment of the present disclosure. For example, as shown in FIG. 13, the semantic classification apparatus 500 may include a memory 510 and a processor 520. For example, the memory 510 is used to store non-transitory computer readable instructions and the processor 520 is used to run the computer readable instructions. The computer readable instructions are executed by the processor 520 to implement the semantic classification method according to any one embodiment of the present disclosure. In other embodiments, the computer readable instructions are executed by the processor 520 to implement the method of training a neural network according to any one embodiment of the present disclosure.

For example, the memory 510 and the processor 520 may communicate with each other directly or indirectly. For example, components such as the memory 510 and the processor 520 may communicate through a network connection. The network may include wireless network, wired network, and/or any combination thereof. The network may also include local area network, internet, telecommunication network, Internet of Things based on internet and/or telecommunication network, and/or any combination thereof and the like. The wired network may communicate, for example, through twisted-pair, coaxial cable or optical fiber transmission or the like, and the wireless network may communicate, for example, through 3G/4G/5G mobile communication network, Bluetooth, Zigbee or WiFi or the like. The specific type and function of the network are not limited herein.

For example, the processor 520 may control other components in the semantic classification apparatus to execute desired functions. The processor 520 may be a device which has data processing capability and/or program execution capability, such as a central processing unit (CPU), a tensor processor (TPU), or a graphics processor (GPU) or the like. The central processing unit (CPU) may be of X86 or ARM architecture. The GPU may be separately and directly integrated into a mainboard or embedded in a north bridge chip of the mainboard. The GPU may also be embedded into a CPU.

For example, the memory 510 may include any combination of one or more computer program products. The computer program products may include various types of computer readable storage media, for example, volatile memory and/or non-volatile memory. The volatile memory may include, for example, random access memory (RAM), and/or cache etc. The non-volatile memory may include, for example, read only memory (ROM), hard disk, erasable programmable read-only memory (EPROM), portable compact disk read only memory (CD-ROM), USB memory and flash memory, etc.

For example, one or more computer instructions may be stored on the memory 510 and can be run by the processor 520 to implement various functions. The computer readable storage medium may also store various application programs and various data, for example, various data used and/or generated by application program, such as the remark sample set of the first object, the remark sample set of the second object, the first original vector, the second original vector and the like.

For example, some computer instructions stored on the memory 510 may be executed by the processor 520 to perform one or more steps in the above-mentioned semantic classification method. For another example, some other computer instructions stored on the memory 510 may be executed by the processor 520 to perform one or more steps in the above-mentioned method of training a neural network.

For example, the detailed descriptions of the processing process of the semantic classification method may be referred to the relevant descriptions in the embodiments of the above-mentioned semantic classification method, and the detailed descriptions of the processing process of the method of training a neural network may be referred to the relevant descriptions in the embodiments of the above-mentioned method of training a neural network. Therefore, redundant descriptions will not be made herein.

It is noted that the semantic classification apparatus according to the embodiments of the present disclosure is illustrative rather than limiting. According to actual application needs, the semantic classification apparatus may also include other common components or structures. For example, in order to realize necessary functions of the semantic classification apparatus, those skilled in the art may dispose other common components or structures according to actual application scenarios, which is not limited in the embodiments of the present disclosure.

Reference may be made to corresponding descriptions of the method of training a neural network and the semantic classification method in the above-mentioned embodiments for the technical effects of the semantic classification apparatus according to the embodiments of the present disclosure, and thus redundant descriptions will not be made herein.

Figure 14:
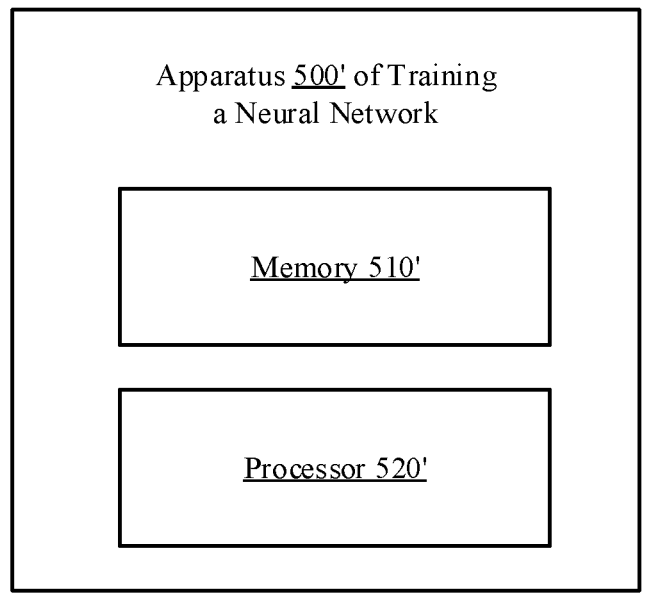
FIG. 14 is an illustrative block diagram of an apparatus of training a neural network according to at least one embodiment of the present disclosure.

At least one embodiment of the present disclosure further provides an apparatus of training a neural network. FIG. 14 is an illustrative block diagram of an apparatus of training a neural network according to at least one embodiment of the present disclosure. For example, as shown in FIG. 14, the apparatus 500' of training a neural network includes a memory 510' and a processor 520'. For example, the memory 510' is used to store non-transitory computer readable instructions and the processor 520' is used to run the computer readable instructions. The computer readable instructions may be executed by the processor 520' to implement the method of training a neural network according to any one embodiment of the present disclosure. In other embodiments of the present disclosure, the computer readable instructions may also be executed by the processor 520' to implement the semantic classification method according to any one embodiment of the present disclosure.

The memory 510' and the processor 520' have the same functions and configurations as the above-mentioned memory 510 and processor 520 and thus will not be described again herein.

Figure 15:
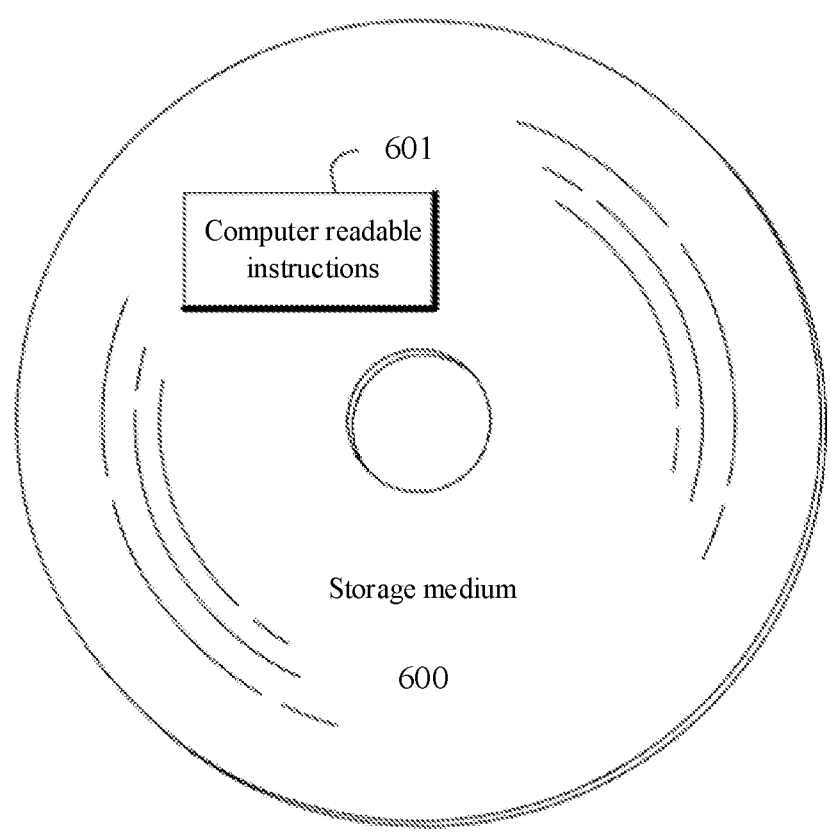
FIG. 15 is a schematic diagram of a storage medium according to at least one embodiment of the present disclosure.

At least one embodiment of the present disclosure further provides a storage medium. FIG. 15 is a schematic diagram of a storage medium according to at least one embodiment of the present disclosure. For example, as shown in FIG. 15, the storage medium 600 stores non-transitory computer readable instructions 601. The non-transitory computer readable instructions 601 are executed by a computer (including a processor) to implement the instructions of the semantic classification method according to any one embodiment of the present disclosure or the instructions of the method of training a neural network according to any one embodiment of the present disclosure. Alternatively, after the instructions of the method of training a neural network according to any one embodiment of the present disclosure are executed, the semantic classification method according to any one embodiment of the present disclosure may be performed.

For example, the storage medium 600 may store one or more computer instructions. Some computer instructions stored on the storage medium 600 may be, for example, instructions for implementing one or more steps in the above-mentioned semantic classification method. Some other instructions stored on the storage medium may be, for example, instructions for implementing one or more steps in the above-mentioned method of training a neural network.

For example, the storage medium may include a storage component of a tablet computer, a hard disk of a personal computer, random access memory (RAM), read only memory (ROM), erasable programmable read-only memory (EPROM), optical disk read only memory (CD-ROM), flash memory or any combination of the above-mentioned storage medium, or any another suitable storage medium.

Reference may be made to corresponding descriptions of the method of training a neural network and the semantic classification method in the above-mentioned embodiments for the technical effects of the storage medium according to the embodiments of the present disclosure, and thus redundant descriptions will not be made herein.

For the present disclosure, the following several points are described:
(1) In the accompanying drawings of the embodiments of the present disclosure, only the structures involved in the embodiments of the present disclosure are involved and other structures may be designed by referring to conventional design.
(2) In a case of no conflicts, features in one or more embodiments of the present disclosure may be combined mutually.

The above-mentioned descriptions are made only to the specific embodiments of the present disclosure but the scope of protection of the present disclosure is not limited hereto. Any changes or substitutions easily contemplated by those skilled in the art within the technical scope of the present disclosure shall all fall into the scope of protection of the present disclosure. The scope of protection of the present disclosure is indicated in the appended claims.

The invention claimed is:

1. A semantic classification method, comprising:
   inputting a first remark relating to a first object to a neural network, wherein the neural network comprises a generative network, a first branch network, a first classification network, a second branch network and a second classification network;
   extracting a first common representation vector for representing a common representation in the first remark by processing the first remark using a common representation extractor;
   extracting a first single representation vector for representing a single representation in the first remark by processing the first remark using a first representation extractor;
   obtaining a first representation vector by splicing the first common representation vector and the first single representation vector; and
   obtaining a semantic classification of the first remark by processing the first representation vector using a first semantic classifier;
   wherein the common representation comprises an intention representation which is used to remark on both the first object and a second object, the second object is an associated remarked object different from the first object, and the single representation in the first remark comprises an intention representation which is only used to remark on the first object;
   wherein the neural network is trained by:
   inputting a first training remark relating to a first object, extracting a first training common representation vector by processing the first training remark using the generative network, extracting a first training single representation vector by processing the first training remark using the first branch network, obtaining a first training representation vector by splicing the first training common representation vector and the first training single representation vector, and obtaining a predicted class label of semantic classification of the first training remark by processing the first training representation vector using the first classification network;
   inputting a second training remark relating to a second object, extracting a second training common representation vector by processing the second training remark using the generative network, extracting a second training single representation vector by processing the second training remark using the second branch network, obtaining a second training representation vector by splicing the second training common representation vector and the second training single representation vector, and obtaining a predicted class label of semantic classification of the second training remark by processing the second training representation vector using the second classification network;
   calculating a system loss value through a system loss function based on the predicted class label of the first training remark and the predicted class label of the second training remark; and
   correcting parameters of the generative network, the first branch network, the first classification network, the second branch network and the second classification network based on the system loss value;
   wherein the first object and the second object are associated remarked objects.

2. The semantic classification method according to claim 1, further comprising: mapping the first remark as a first original vector; wherein,
   processing the first remark using the common representation extractor comprises: processing the first original vector using the common representation extractor;
   processing the first remark using the first representation extractor comprises processing the first original vector using the first representation extractor.

3. The semantic classification method according to claim 2, wherein mapping the first remark as the first original vector comprises:
   obtaining the first original vector by mapping each word in the first remark as a vector with a specified length based on word vector algorithm.

4. The semantic classification method according to claim 1, further comprising:
   inputting a second remark relating to the second object;
   extracting a second common representation vector for representing the common representation in the second remark by processing the second remark using the common representation extractor;
   extracting a second single representation vector for representing a single representation in the second remark by processing the second remark using a second representation extractor;
   obtaining a second representation vector by splicing the second common representation vector and the second single representation vector; and
   obtaining a semantic classification of the second remark by processing the second representation vector using a second semantic classifier;

wherein the single representation in the second remark comprises an intention representation which is only used to remark on the second object.

5. The semantic classification method according to claim 4, further comprising: mapping the second remark as a second original vector; wherein,
processing the second remark using the common representation extractor comprises processing the second original vector using the common representation extractor;
processing the second remark using the second representation extractor comprises processing the second original vector using the second representation extractor.

6. The semantic classification method according to claim 5, wherein mapping the second remark as the second original vector comprises:
obtaining the second original vector by mapping each word in the second remark as a vector with a specified length based on word vector algorithm.

7. The semantic classification method according to claim 4, wherein,
the common representation extractor, the first representation extractor and the second representation extractor each comprise one of a recurrent neural network, a long short term memory network and a bi-directional long short term memory network respectively, and
the first semantic classifier and the second semantic classifier each comprise a softmax classifier.

8. The semantic classification method according to claim 4, wherein corpus sources of the first remark and the second remark comprise at least one of text or voice.

9. A method of training a neural network, wherein the neural network comprises a generative network, a first branch network, a first classification network, a second branch network and a second classification network; the training method comprises a semantic classification training stage; wherein,
the semantic classification training stage comprises:
inputting a first training remark relating to a first object, extracting a first training common representation vector by processing the first training remark using the generative network, extracting a first training single representation vector by processing the first training remark using the first branch network, obtaining a first training representation vector by splicing the first training common representation vector and the first training single representation vector, and obtaining a predicted class label of semantic classification of the first training remark by processing the first training representation vector using the first classification network;
inputting a second training remark relating to a second object, extracting a second training common representation vector by processing the second training remark using the generative network, extracting a second training single representation vector by processing the second training remark using the second branch network, obtaining a second training representation vector by splicing the second training common representation vector and the second training single representation vector, and obtaining a predicted class label of semantic classification of the second training remark by processing the second training representation vector using the second classification network;
calculating a system loss value through a system loss function based on the predicted class label of the first training remark and the predicted class label of the second training remark; and
correcting parameters of the generative network, the first branch network, the first classification network, the second branch network and the second classification network based on the system loss value;
wherein the first object and the second object are associated remarked objects.

10. The training method according to claim 9, wherein the semantic classification training stage further comprises:
mapping the first training remark as a first training original vector, and mapping the second training remark as a second training original vector; wherein,
processing the first training remark using the generative network comprises: processing the first training original vector using the generative network;
processing the first training remark using the first branch network comprises: processing the first training original vector using the first branch network;
processing the second training remark using the generative network comprises: processing the second training original vector using the generative network;
processing the second training remark using the second branch network comprises: processing the second training original vector using the second branch network.

11. The training method according to claim 10, wherein mapping the first training remark as the first training original vector comprises:
obtaining the first training original vector by mapping each word in the first training remark as a vector with a specified length based on word vector algorithm;
mapping the second training remark as the second training original vector comprises:
obtaining the second training original vector by mapping each word in the second training remark as a vector with a specified length based on word vector algorithm.

12. The training method according to claim 9, wherein,
the generative network, the first branch network and the second branch network each comprise one of a recurrent neural network, a long short term memory network and a bi-directional long short term memory network respectively, and
the first classification network and the second classification network comprise a softmax classifier respectively.

13. The training method according to claim 9, wherein the system loss function is expressed as:

$$L_{obj}=\lambda_1 \cdot L(Y1,T1)+\lambda_2 \cdot L(Y2,T2)$$

wherein $L_{obj}$ represents the system loss function, $L(\bullet, \bullet)$ represents a cross entropy loss function, Y1 represents the predicted class label of the first training remark, T1 represents a true class label of the first training remark, L(Y1,T1) represents a cross entropy loss function of the first training remark, X represents a weight of the cross entropy loss function L(Y1,T1) of the first training remark in the system loss function, Y2 represents the predicted class label of the second training remark, T1 represents a true class label of the second training remark, L(Y2,T2) represents a cross entropy loss function of the second training remark, X2 represents a weight of the cross entropy loss function L(Y2,T2) of the second training remark in the system loss function; the cross entropy loss function $L(\bullet, \bullet)$ is expressed as:

$$L(Y, T) = -\sum_{i=1}^{N}\sum_{j=1}^{K} Y_i^j \log(T_i^j)$$

wherein Y and T are formal parameters, N represents a number of training remarks, K represents a number of class labels of semantic classification, $Y_i^j$ represents a probability value of a j-th class label in predicted class labels of an i-th training remark, and $T_i^j$ represents a probability value of a j-th class label in true class labels of an i-th training remark.

14. The training method according to claim 9, wherein the neural network further comprises a discriminative network; the training method further comprises: a generative adversarial training stage; and performing the generative adversarial training stage and the semantic classification training stage alternately; wherein,
the generative adversarial training stage comprises:
training the discriminative network based on the generative network;
training the generative network based on the discriminative network; and
performing the above training processes alternately, so as to complete a training of the generative adversarial training stage.

15. The training method according to claim 14, wherein training the discriminative network based on the generative network comprises:
inputting a third training remark relating to the first object, extracting a third training common representation vector by processing the third training remark using the generative network, obtaining a third training output by processing the third training common representation vector using the discriminative network;
inputting a fourth training remark relating to the second object, extracting a fourth training common representation vector by processing the fourth training remark using the generative network, obtaining a fourth training output by processing the fourth training common representation vector using the discriminative network;
calculating a discriminative network adversarial loss value through a discriminative network adversarial loss function based on the third training output and the fourth training output; and
correcting a parameter of the discriminative network based on the discriminative network adversarial loss value.

16. The training method according to claim 15, wherein the discriminative network adversarial loss function is expressed as:

$$L_D = -E_{z1 \sim P_{data}(z1)}[\log D(G(z1))] - E_{z2 \sim P_{data}(z2)}[1-\log D(G(z2))]$$

wherein $L_D$ represents the discriminative network adversarial loss function, z1 represents the third training remark, $P_{data}(z1)$ re presents a set of third training remarks, G(z1) represents the third training common representation vector, D(G(z1)) represents the third training output, $E_{z1 \sim P_{data}(z1)}$ represents an expectation value for the set of the third training remarks, z2 represents the fourth training remark, data $P_{data}(z2)$ re presents a set of fourth training remarks, G(z2) represents the fourth training common representation vector, D(G(z2)) represents the fourth training output, $E_{z2 \sim P_{data}(z2)}$ represents an expectation value for the set of the fourth training remarks.

17. The training method according to claim 14, wherein training the generative network based on the discriminative network comprises:
inputting a fifth training remark relating to the first object, extracting a fifth training common representation vector by processing the fifth training remark using the generative network, obtaining a fifth training output by processing the fifth training common representation vector using the discriminative network;
inputting a sixth training remark relating to the second object, extracting a sixth training common representation vector by processing the sixth training remark using the generative network, obtaining a sixth training output by processing the sixth training common representation vector using the discriminative network;
calculating a generative network adversarial loss value through a generative network adversarial loss function based on the fifth training output and the sixth training output; and
correcting a parameter of the generative network based on the generative network adversarial loss value.

18. The training method according to claim 17, wherein the generative network adversarial loss function is expressed as:

$$L_G = -E_{z3 \sim P_{data}(z3)}[\log D(G(z3))] - E_{z4 \sim P_{data}(z4)}[1-\log D(G(z4))]$$

wherein $L_G$ represents the generative network adversarial loss function, z3 represents the fifth training remark, data $P_{data}(z3)$ represents a set of fifth training remarks, G(z3) represents the fifth training common representation vector, D(G(z3)) represents the fifth training output, $E_{z3 \sim P_{data}(z3)}$ represents an expectation value for the set of the fifth training remarks, z4 represents the sixth training remark, $P_{data}(z4)$ represents a set of sixth training remarks, G(z4) represents the sixth training common representation vector, D(G(z4)) represents the sixth training output, $E_{z4 \sim P_{data}(z4)}$ represents an expectation value for the set of the sixth training remarks.

19. An electronic device, comprising:
a memory, storing non-transitory computer readable instructions;
a processor for running the computer readable instructions;
wherein the computer readable instructions are executed by the processor to implement:
inputting a first remark relating to a first object to a neural network, wherein the neural network comprises a generative network, a first branch network, a first classification network, a second branch network and a second classification network;
extracting a first common representation vector for representing a common representation in the first remark by processing the first remark using a common representation extractor;
extracting a first single representation vector for representing a single representation in the first remark by processing the first remark using a first representation extractor;
obtaining a first representation vector by splicing the first common representation vector and the first single representation vector; and
obtaining a semantic classification of the first remark by processing the first representation vector using a first semantic classifier;
wherein the common representation comprises an intention representation which is used to remark on both the first object and a second object, the second object is an associated remarked object different from the first object, and the single representation in the first remark comprises an intention representation which is only used to remark on the first object, or wherein the neural network is trained by:

inputting a first training remark relating to a first object, extracting a first training common representation vector by processing the first training remark using the generative network, extracting a first training single representation vector by processing the first training remark using the first branch network, obtaining a first training representation vector by splicing the first training common representation vector and the first training single representation vector, and obtaining a predicted class label of semantic classification of the first training remark by processing the first training representation vector using the first classification network;

inputting a second training remark relating to a second object, extracting a second training common representation vector by processing the second training remark using the generative network, extracting a second training single representation vector by processing the second training remark using the second branch network, obtaining a second training representation vector by splicing the second training common representation vector and the second training single representation vector, and obtaining a predicted class label of semantic classification of the second training remark by processing the second training representation vector using the second classification network;

calculating a system loss value through a system loss function based on the predicted class label of the first training remark and the predicted class label of the second training remark; and correcting parameters of the generative network, the first branch network, the first classification network, the second branch network and the second classification network based on the system loss value;

wherein the first object and the second object are associated remarked objects.

20. A storage medium, storing non-transitory computer readable instructions, wherein the non-transitory computer readable instructions are executed by a computer to execute the semantic classification method according to claim 1.

* * * * *